United States Patent
Yang

(10) Patent No.: US 11,762,555 B2
(45) Date of Patent: *Sep. 19, 2023

(54) I/O REQUEST PROCESSING METHOD, STORAGE ARRAY, AND HOST

(71) Applicant: HUAWEI TECHNOLOGIES CO., LTD., Guangdong (CN)

(72) Inventor: Feng Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/547,263

(22) Filed: Dec. 10, 2021

(65) Prior Publication Data

US 2022/0100384 A1 Mar. 31, 2022

Related U.S. Application Data

(63) Continuation of application No. 16/842,634, filed on Apr. 7, 2020, now Pat. No. 11,209,983, which is a (Continued)

(30) Foreign Application Priority Data

Oct. 10, 2017 (WO) ................ PCT/CN2017/105538

(51) Int. Cl.
    *G06F 3/06* (2006.01)
(52) U.S. Cl.
    CPC .......... *G06F 3/0607* (2013.01); *G06F 3/0656* (2013.01); *G06F 3/0659* (2013.01); *G06F 3/0665* (2013.01); *G06F 3/0689* (2013.01)

(58) Field of Classification Search
    CPC .. G06F 11/00; G06F 11/1092; G06F 11/1458; G06F 11/2094; G06F 3/0607;
    (Continued)

(56) References Cited

U.S. PATENT DOCUMENTS 8,060,710 B1 11/2011 Don et al.
8,380,674 B1 2/2013 Bolen et al.
(Continued)

FOREIGN PATENT DOCUMENTS

CN 101196797 A 6/2008
CN 102521058 A 6/2012
(Continued)

*Primary Examiner* — Yong J Choe
(74) *Attorney, Agent, or Firm* — HUAWEI TECHNOLOGIES CO., LTD.

(57) ABSTRACT

An agent module of a host directs I/O requests accessing a first disk of a first storage array to access a second disk of a second storage array. The agent module obtains a disk identifier of a first disk in the first storage array and a disk identifier of a second disk in the second storage array to record a mapping relationship between them. The agent module further reports virtual path information for a virtual path between the agent module and a multipath module of the host to the multipath module. The agent module sends the disk identifier of the first disk via the virtual path after receiving a disk identifier query request for querying the identifier of the second disk. Thus, the agent module can send an I/O request for accessing the first disk to the second storage array to access the second disk.

20 Claims, 16 Drawing Sheets

Related U.S. Application Data continuation of application No. PCT/CN2017/110744, filed on Nov. 13, 2017.

(58) Field of Classification Search
CPC .... G06F 3/0656; G06F 3/0659; G06F 3/0665; G06F 3/0689
See application file for complete search history.

(56) References Cited

U.S. PATENT DOCUMENTS

| | | |
|---|---|---|
| 9,229,656 B1 | 1/2016 | Contreras et al. |
| 9,460,028 B1 | 10/2016 | Raizen et al. |
| 9,696,917 B1 | 7/2017 | Sareena et al. |
| 9,933,957 B1 * | 4/2018 | Cohen .................. G06F 9/4856 |
| 2006/0236149 A1 | 10/2006 | Nguyen et al. |
| 2007/0239944 A1 | 10/2007 | Rupanagunta et al. |
| 2012/0278567 A1 | 11/2012 | Broido et al. |
| 2014/0281306 A1 | 9/2014 | Nakajima et al. |

FOREIGN PATENT DOCUMENTS

| | | | |
|---|---|---|---|
| CN | 103257941 | A | 8/2013 |
| CN | 103309625 | A | 9/2013 |
| CN | 105677506 | A | 6/2016 |
| CN | 106484327 | A | 3/2017 |
| WO | 2017088342 | A1 | 6/2017 |

\* cited by examiner

| Name | Query VPD Page 0xC8 | | |
|---|---|---|---|
| Function | Function description: Instruct a target array to generate an image disk | | |
| Parameter | Byte | Value | Description |
| | CDB[0] | 0x12 | Query command |
| | CDB[2] | 0xc8 | Instruct a target array to generate an image disk |
| Buffer | Byte | Reference value | Description |
| Sending information | 0 | AAA | Vendor information of a to-be-migrated disk |
| | 1 | BBB | Product information of the to-be-migrated disk |
| | 3–66 | XXXXXXXXX | WWN of the to-be-migrated disk |
| Returning information | 67 | CCC | Vendor information of an image disk |
| | 68 | DDD | Product information of the image disk |
| | 69–132 | XXXXXXXXX | WWN of the image disk |

FIG. 6

I/O REQUEST PROCESSING METHOD, STORAGE ARRAY, AND HOST

CROSS-REFERENCE TO RELATED APPLICATIONS

This application is a continuation of U.S. application Ser. No. 16/842,634, filed on Apr. 7, 2020, which is a continuation of International Application No. PCT/CN2017/110744, filed on Nov. 13, 2017, which claims priority to International Application No. PCT/CN2017/105538, filed on Oct. 10, 2017. The disclosures of the aforementioned applications are hereby incorporated by reference in their entirety.

TECHNICAL FIELD

This application relates to the storage field, and in particular to a field for directing I/O requests accessing a first disk in a first storage array to access a second disk in a second storage array.

BACKGROUND

In IT operation and maintenance, an old storage array usually needs to be replaced with a new storage array, and data in the old storage array needs to be migrated to the new storage array. However, in many scenarios such as the financial industry and the telecommunication carrier industry, a user expects to perform online processing on an Input/Output (I/O) request between the old storage array and the new storage array to avoid service interruption or data loss.

In an existing I/O request processing method, online data migration can be implemented between homogeneous storage arrays (storage arrays that can be managed by a same multipath module, where the multipath module is software executed by a host), but online data migration cannot be implemented between heterogeneous storage arrays (storage arrays that cannot be managed by a same multipath module).

SUMMARY

Embodiments of the present application provide an I/O request processing method and device, and a host, to implement online data migration between heterogeneous storage arrays.

A first aspect of the embodiments of the present application provides an I/O request processing method, and the method is used to migrate data in a to-be-migrated disk in a first storage array to a second storage array online. In an implementation of this aspect, an agent module is installed on a host, and the agent module performs the I/O request processing method. After detecting an migration request sent to the host, the agent module obtains a disk identifier of the to-be-migrated disk and an array identifier of the second storage array from the I/O request processing request, and sends the disk identifier of the to-be-migrated disk to the second storage array corresponding to the array identifier, so that the second storage array can create an image disk of the to-be-migrated disk based on the disk identifier of the to-be-migrated disk. After the second storage array completes creation of the image disk, the agent module instructs the second storage array to report a disk identifier of a disk of the host, sets virtual path information for a path used for reporting a disk identifier of the image disk, and reports the virtual path information to a multipath module of the host.

Then the agent module receives a disk identifier query command sent by the host by using a virtual path indicated by the virtual path information. After receiving the disk identifier query command, the agent module sends the disk identifier of the to-be-migrated disk to the multipath module, so that the multipath module can use the virtual path as a path of the to-be-migrated disk, and set the virtual path as a preferential access path of the to-be-migrated disk. That is, an input/output I/O request for accessing the to-be-migrated disk is preferentially delivered by using the virtual path.

The agent module is installed on the host, and the agent module intercepts the disk identifier of the image disk that is reported by the second storage array to the multipath module, and sets a virtual path that points to the agent module for a path used for reporting the image disk. When the multipath module inquires the disk identifier of the image disk by using the virtual path, the agent module reports the disk identifier of the to-be-migrated disk to the multipath module by using the virtual path, so that the multipath module uses the virtual path as the path of the to-be-migrated disk, and uses the virtual path as the preferential access path. In this way, the host can deliver, by using the virtual path, the received I/O request for accessing the to-be-migrated disk to the second storage array in which the image disk is located, to implement online migration of the data in the to-be-migrated disk.

In a possible implementation of the first aspect, after obtaining the disk identifier of the image disk sent after the second storage array creates the image disk, the agent module establishes a mapping relationship between the disk identifier of the image disk and the disk identifier of the to-be-migrated disk. In this way, after receiving a disk identifier query request, the agent module obtains the disk identifier of the image disk based on a disk code of the image disk in the disk identifier query request, obtains, based on the mapping relationship, the disk identifier of the to-be-migrated disk corresponding to the disk identifier of the image disk, and sends the disk identifier of the to-be-migrated disk to the multipath module.

The mapping relationship between the disk identifier of the to-be-migrated disk and the disk identifier of the image disk is established, so that when receiving the disk identifier of the image disk, the agent module can quickly find the disk identifier of the to-be-migrated disk corresponding to the disk identifier of the image disk.

With reference to any one of the foregoing possible implementations of the first aspect, in a possible implementation, when instructing the second storage array to report the disk identifier of the disk of the host, the agent module first triggers an operating system of the host to send a disk report command to the second storage array, and the disk report command instructs the second storage array to generate report information according to the report command and report the report information. Then, after receiving the report information, the agent module obtains path information in the report information, and the path information is path information of a path for reporting the report information and is generated in a process of reporting the report information. Finally, the agent module sends a disk identifier query command to the second storage array by using the path determined based on the path information, to instruct the second storage array to report the disk identifier of the disk of the host.

In this possible implementation, after triggering the operating system to send the disk report command to the second storage array, the agent module intercepts the report information that is reported by the second storage array to the multipath module, and the agent module obtains the disk identifier in the second storage array, so that the agent module can set a virtual path used for accessing the to-be-migrated disk for the path used for reporting the disk identifier of the image disk.

With reference to any one of the foregoing possible implementations of the first aspect, in a possible implementation, the agent module obtains the disk identifier of the image disk sent after the second storage array creates the image disk; and establishes a mapping relationship between the disk identifier of the image disk and the disk identifier of the to-be-migrated disk. After the disk identifier of the disk of the host that is reported by the second storage array is received, if the reported disk identifier exists in the mapping relationship, the agent module determines that the reported disk identifier is the disk identifier of the image disk, and after determining the disk identifier of the image disk, sets the virtual path information for the path used for reporting the disk identifier of the image disk.

With reference to any one of the foregoing possible implementations of the first aspect, in a possible implementation, the virtual path information includes a path number and a path pointer, the path number is used to indicate the path used for reporting the image disk identifier, and the path pointer points to the path used for reporting the image disk identifier.

The path pointer is set, so that a request delivered by the multipath module by using the virtual path can be delivered to the agent module.

With reference to any one of the foregoing possible implementations of the first aspect, in a possible implementation, a vendor of the first storage array is different from that of the second storage array, and the identifier of the to-be-migrated disk and the disk identifier of the image disk include vendor information.

The present application is more advantageous to online data migration between the first storage array and the second storage array of different vendors.

With reference to any one of the foregoing possible implementations of the first aspect, in a possible implementation, the agent module sends the disk identifier of the to-be-migrated disk to the second storage array by using a private command in a communication protocol between the host and the second storage array.

With reference to any one of the foregoing possible implementations of the first aspect, in a possible implementation, the private command includes a command descriptor block and a buffer; the command descriptor block instructs the second storage array to generate the image disk; and the buffer includes an information sending portion and an information returning portion, the information sending portion is used to write the disk identifier of the to-be-migrated disk, and the information returning portion is used to write the disk identifier of the image disk after the second storage array creates the image disk.

With reference to any one of the foregoing possible implementations of the first aspect, in a possible implementation, the migration method further includes: after the multipath module sets the virtual path as the preferential access path of the to-be-migrated disk, the agent module sends a migration command to the second storage array. The migration command instructs the second storage array to migrate the data in the to-be-migrated disk, and the migration command includes the disk identifier of the image disk or the disk identifier of the to-be-migrated disk.

A second aspect of the present application provides an I/O request processing method, and the method is used to migrate data in a to-be-migrated disk in a first storage array to a second storage array online. The processing method is executed by a host. The host obtains a disk identifier of the to-be-migrated disk and an array identifier of the second storage array based on a detected migration request, and sends the disk identifier of the to-be-migrated disk to the second storage array corresponding to the array identifier, so that the second storage array creates an image disk of the to-be-migrated disk based on the disk identifier of the to-be-migrated disk. The to-be-migrated disk is created in the first storage array. Then the host sets the image disk as a preferential access disk of a disk object of the to-be-migrated disk, receives an input/output I/O request for accessing the to-be-migrated disk, and sends the I/O request to the image disk based on a name that is of the disk object of the to-be-migrated disk and that is carried in the I/O request.

An effect of the I/O request processing method provided in the second aspect of the present application is the same as that of the I/O request processing method provided in the first aspect, and details are not described herein again.

With reference to the second aspect of the present application, in a first possible implementation, an agent module and a multipath module run on the host. When the host sets the image disk as the preferential access disk of the disk object of the to-be-migrated disk, the agent module instructs the second storage array to report a disk identifier of a disk of the host, sets virtual path information for a path used for reporting a disk identifier of the image disk, and reports the virtual path information to the multipath module. The agent module receives a disk identifier query request sent by the multipath module by using a virtual path, where the virtual path is determined based on the virtual path information; and sends the disk identifier of the to-be-migrated disk to the multipath module, so that the multipath module uses the virtual path as a path of the disk object of the to-be-migrated disk, and sets the virtual path as a preferential access path of the disk object of the to-be-migrated disk.

With reference to the first possible implementation of the second aspect of the present application, in a possible implementation, when the I/O request is being sent to the image disk, the preferential access path of the disk object is first determined based on the disk object identifier, and then the I/O request is sent to the image disk by using the preferential access path.

In a possible implementation of the second aspect, after obtaining the disk identifier of the image disk sent after the second storage array creates the image disk, the agent module establishes a mapping relationship between the disk identifier of the image disk and the disk identifier of the to-be-migrated disk. In this way, after receiving the disk identifier query request, the agent module obtains the disk identifier of the image disk based on a disk code of the image disk in the disk identifier query request, obtains, based on the mapping relationship, the disk identifier of the to-be-migrated disk corresponding to the disk identifier of the image disk, and sends the disk identifier of the to-be-migrated disk to the multipath software.

The mapping relationship between the disk identifier of the to-be-migrated disk and the disk identifier of the image disk is established, so that when receiving the disk identifier of the image disk, the agent module can quickly find the disk identifier of the to-be-migrated disk corresponding to the disk identifier of the image disk.

With reference to any one of the foregoing possible implementations of the second aspect, in a possible implementation, when instructing the second storage array to report the disk identifier of the disk of the host, the agent module first triggers an operating system of the host to send a disk report command to the second storage array, and the disk report command instructs the second storage array to generate report information according to the report command and report the report information. Then, after receiving the report information, the agent module obtains path information in the report information, and the path information is path information of a path for reporting the report information and is generated in a process of reporting the report information. Finally, the agent module sends a disk identifier query command to the second storage array by using the path determined based on the path information, to instruct the second storage array to report the disk identifier of the disk of the host.

In this possible implementation, after triggering the operating system to send the disk report command to the second storage array, the agent module intercepts the report information that is reported by the second storage array to the multipath module, and the agent module obtains the disk identifier in the second storage array, so that the agent module can set a virtual path used for accessing the to-be-migrated disk for the path used for reporting the disk identifier of the image disk.

With reference to any one of the foregoing possible implementations of the second aspect, in a possible implementation, the agent module obtains the disk identifier of the image disk sent after the second storage array creates the image disk; and establishes a mapping relationship between the disk identifier of the image disk and the disk identifier of the to-be-migrated disk. After the disk identifier of the disk of the host that is reported by the second storage array is received, if the reported disk identifier exists in the mapping relationship, the agent module determines that the reported disk identifier is the disk identifier of the image disk, and after determining the disk identifier of the image disk, sets the virtual path information for the path used for reporting the disk identifier of the image disk.

With reference to any one of the foregoing possible implementations of the second aspect, in a possible implementation, the virtual path information includes a path number and a path pointer, the path number is used to indicate the path used for reporting the image disk identifier, and the path pointer points to the path used for reporting the image disk identifier.

The path pointer is set, so that an OR request delivered by the multipath module by using the virtual path can be delivered to the agent module.

With reference to any one of the foregoing possible implementations of the second aspect, in a possible implementation, a vendor of the first storage array is different from that of the second storage array, and the identifier of the to-be-migrated disk and the disk identifier of the image disk include vendor information.

The present application is more advantageous to online data migration between the first storage array and the second storage array of different vendors.

With reference to any one of the foregoing possible implementations of the second aspect, in a possible implementation, the agent module sends the disk identifier of the to-be-migrated disk to the second storage array by using a private command in a communication protocol between the host and the second storage array.

With reference to any one of the foregoing possible implementations of the second aspect, in a possible implementation, the private command includes a command descriptor block and a buffer; the command descriptor block instructs the second storage array to generate the image disk; and the buffer includes an information sending portion and an information returning portion, the information sending portion is used to write the disk identifier of the to-be-migrated disk, and the information returning portion is used to write the disk identifier of the image disk after the second storage array creates the image disk.

With reference to any one of the foregoing possible implementations of the second aspect, in a possible implementation, the migration method further includes: after the multipath module sets the virtual path as the preferential access path of the to-be-migrated disk, sending a migration command to the second storage array, where the migration command instructs the second storage array to migrate the data in the to-be-migrated disk, and the migration command includes the disk identifier of the image disk.

A third aspect of the present application provides an I/O request processing method, and the method is used to migrate data in a to-be-migrated disk in a first storage array to a second storage array online. The processing method is executed by a host. The host obtains a disk identifier of the to-be-migrated disk and an array identifier of the second storage array based on a detected data migration request, and sends the disk identifier of the to-be-migrated disk to the second storage array corresponding to the array identifier, so that the second storage array creates an image disk of the to-be-migrated disk based on the disk identifier of the to-be-migrated disk. The to-be-migrated disk is created in the first storage array. Then the host sets the image disk as a preferential access disk of a disk object of the to-be-migrated disk. When receiving an input/output I/O request for accessing the to-be-migrated disk, the host sends the I/O request to the image disk based on a name that is of the disk object of the to-be-migrated disk and that is carried in the I/O request.

The third aspect of the embodiments of the present application provides the I/O request processing method applied to the host. A difference between the migration method provided in the second aspect of the embodiments of the present application and the migration method provided in the first aspect lies in that in the embodiment of the second aspect, the agent module generates an integrated command after obtaining a migration request. The integrated command includes two commands: an image disk generation command and a migration command. The image disk generation command and the migration command are the same as those in the implementation provided in the first aspect. Execution orders and trigger conditions of the image disk generation command and the migration command are defined in the integrated command. For example, it may be specified that the image disk generation command is executed first, and then the migration command is executed. The execution condition of the migration command is defined: the migration command is executed after the second storage array completes establishment of a virtual path or is executed after a preset time.

In the implementation provided in the third aspect, the agent module needs to send a command to the second storage array only once, thereby reducing interaction between the host and the storage array.

A fourth aspect of the present application provides an I/O request processing method applied to a host, and the method is used to migrate data in a to-be-migrated disk in a first storage array to a second storage array online. In an implementation of this aspect, an agent module is installed on the host, and the agent module performs the I/O request processing method. After detecting a migration request sent to the host, the agent module obtains a disk identifier of the to-be-migrated disk from the I/O request processing request, and returns the to-be-migrated disk identifier to a client, so that the client obtains the disk identifier and sends the disk identifier of the to-be-migrated disk to the second storage array corresponding to an array identifier, and the second storage array creates an image disk of the to-be-migrated disk based on the disk identifier of the to-be-migrated disk. After receiving a feedback command indicating that the second storage array completes creation of the image disk, the agent module receives a command that is used for establishing a virtual path and that is sent by the client, instructs, according to the command, the second storage array to report a disk identifier of a disk of the host, sets virtual path information for a path used for reporting a disk identifier of the image disk, and reports the virtual path information to a multipath module of the host. The reported virtual path information instructs the host to send a disk identifier query command to the agent module by using a virtual path indicated by the virtual path information. The agent module sends the disk identifier of the to-be-migrated disk to the multipath module after receiving the disk identifier query command, so that the multipath module uses the virtual path as a path of the to-be-migrated disk, and sets the virtual path as a preferential access path of the to-be-migrated disk. Therefore, an input/output I/O request for accessing the to-be-migrated disk is preferentially delivered by using the virtual path. The agent module sends a virtual path establishment complete feedback command to the client, and the client sends a migration command to the second storage array. The migration command instructs the second storage array to migrate the data in the to-be-migrated disk.

The agent module is installed on the host, and the agent module intercepts the disk identifier of the image disk that is reported by the second storage array to the multipath module, and sets a virtual path that points to the agent module for a path used for reporting the image disk. When the multipath module inquires the disk identifier of the image disk by using the virtual path, the agent module reports the disk identifier of the to-be-migrated disk to the multipath module by using the virtual path, so that the multipath module uses the virtual path as the path of the to-be-migrated disk, and uses the virtual path as the preferential access path. In this way, the host can deliver, by using the virtual path, the received I/O request for accessing the to-be-migrated disk to the second storage array in which the image disk is located, to implement online migration of the data in the to-be-migrated disk.

A fifth aspect of the present application provides an input/output I/O request processing method. The method is executed by a target storage array. The target storage array is connected to a host, and a client is connected to the host and the target storage array. When receiving an image disk generation command sent by the client, the target storage array creates an image disk of a to-be-migrated disk based on a disk identifier of the to-be-migrated disk carried in the image disk generation command. The to-be-migrated disk is created in a source storage array. Then the target storage array receives a disk identifier query request sent by the host, and reports the disk identifier of the to-be-migrated disk to the host by using an access path of the image disk, so that the host records the access path of the image disk as an access path of the to-be-migrated disk, and the client sets the access path of the image disk as a preferential access path of the to-be-migrated disk.

When the target storage array creates the image disk of the to-be-migrated disk, and the host inquires a disk identifier of the image disk by using the access path of the image disk, the target storage array sends the disk identifier of the to-be-migrated disk to the host, so that the host records the access path of the image disk as the access path of the to-be-migrated disk, and the client sets the access path of the image disk as the preferential access path of the to-be-migrated disk. In this way, the host can deliver, by using the access path of the image disk, a received I/O request for accessing the to-be-migrated disk to the second storage array, to implement online migration of data in the to-be-migrated disk.

According to the fifth aspect of the present application, in a possible implementation, after completing creation of the image disk of the to-be-migrated disk, the target storage array establishes a mapping relationship between the disk identifier of the image disk and the disk identifier of the to-be-migrated disk. Before reporting the disk identifier of the to-be-migrated disk to the host, and after receiving the disk identifier query request, the target storage array obtains the disk identifier of the image disk based on a disk code of the image disk in the disk identifier query request, and obtains, based on the mapping relationship, the disk identifier of the to-be-migrated disk corresponding to the disk identifier of the image disk.

According to the fifth aspect of the present application, in a possible implementation, before receiving the disk identifier query request, and after completing creation of the image disk, the target storage array sends a feedback command to the client, so that the client triggers the host to send a disk report command to the target storage array. After receiving the disk report command, the target storage array obtains, based on host port information in the report command, a disk code corresponding to the host port information, and reports the disk code of the image disk to the host, where a path for reporting the image disk code is the access path of the image disk, so that the host sends the disk identifier query request by using the access path of the image disk.

According to any one of the foregoing possible implementations of the fifth aspect of the present application, the target storage array receives a migration command sent by the client, and migrates the data in the to-be-migrated disk to the image disk according to the migration command.

A sixth aspect of the embodiments of the present application provides a host. The host includes an image instruction unit, a path reporting unit, and a disk identifier reporting unit. The image instruction unit is configured to: obtain a disk identifier of a to-be-migrated disk and an array identifier of a second storage array based on a detected migration request, and send the disk identifier of the to-be-migrated disk to the second storage array corresponding to the array identifier, so that the second storage array creates an image disk of the to-be-migrated disk based on the disk identifier of the to-be-migrated disk, where the to-be-migrated disk is created in a first storage array. The path reporting unit is configured to: instruct the second storage array to report a disk identifier of a disk of the host, set virtual path information for a path used for reporting a disk identifier of the image disk, and report the virtual path information to a multipath module of the host. The disk identifier reporting unit is configured to: receive a disk identifier query request sent by the multipath module of the host by using a virtual path, where the virtual path is determined based on the virtual path information; and send the disk identifier of the to-be-migrated disk to the multipath module, so that the multipath module manages the virtual path as a path of the to-be-migrated disk, and sets the virtual path as a preferential access path of the to-be-migrated disk. Therefore, an input/output I/O request for accessing the to-be-migrated disk is preferentially delivered by using the virtual path.

Another possible implementation of the migration device provided in the sixth aspect is corresponding to an implementation of the migration method provided in the first aspect, and details are not described herein again.

A seventh aspect of the embodiments of the present application provides a host, and the host is connected to a first storage array and a second storage array. The host includes an image instruction unit, a setting unit, and an I/O delivering unit. The image instruction unit is configured to: obtain a disk identifier of a to-be-migrated disk and an array identifier of the second storage array based on a detected migration request, and send the disk identifier of the to-be-migrated disk to the second storage array corresponding to the array identifier, so that the second storage array creates an image disk of the to-be-migrated disk based on the disk identifier of the to-be-migrated disk, where the to-be-migrated disk is created in the first storage array. The setting unit is configured to set the image disk as a preferential access disk of a disk object of the to-be-migrated disk. The I/O delivering unit is configured to: receive an input/output I/O request for accessing the to-be-migrated disk, and send the I/O request to the image disk based on a name that is of the disk object of the to-be-migrated disk and that is carried in the I/O request.

Another possible implementation of the host provided in the seventh aspect is corresponding to an implementation of the migration method provided in the second aspect, and details are not described herein again.

An eighth aspect of the embodiments of the present application provides a target storage array, the target storage array is connected to a host, and a client is connected to the host and the target storage array. The target storage array includes an image disk generation unit and a reporting unit. The image disk generation unit is configured to: receive an image disk generation command sent by the client, and create an image disk of a to-be-migrated disk based on a disk identifier of the to-be-migrated disk carried in the image disk generation command, where the to-be-migrated disk is created in a source storage array. The reporting unit is configured to: receive a disk identifier query request sent by the host, and report the disk identifier of the to-be-migrated disk to the host by using an access path of the image disk. In this way, the host can record the access path of the image disk as an access path of the to-be-migrated disk, so that the client sets the access path of the image disk as a preferential access path of the to-be-migrated disk.

Another possible implementation of the target storage device provided in the eighth aspect is corresponding to an implementation of the migration method provided in the second aspect, and details are not described herein again.

A ninth aspect of the embodiments of the present application provides a host. The host includes a processor and a memory. The memory is connected to the processor and is configured to store a program instruction. The processor executes the program instruction to perform the I/O request processing method in any one of the possible implementations provided in the first aspect to the sixth aspect.

A tenth aspect of the embodiments of the present application provides a computer readable medium, including a computer execution instruction. When a processor of a computer executes the computer execution instruction, the computer performs the I/O request processing method in any one of the possible implementations of the first aspect to the sixth aspect.

BRIEF DESCRIPTION OF DRAWINGS

FIG. 6 is a description table of an image disk generation command defined by using a private command in the SCSI protocol according to an embodiment of the present application;

DESCRIPTION OF EMBODIMENTS

Figure 1:
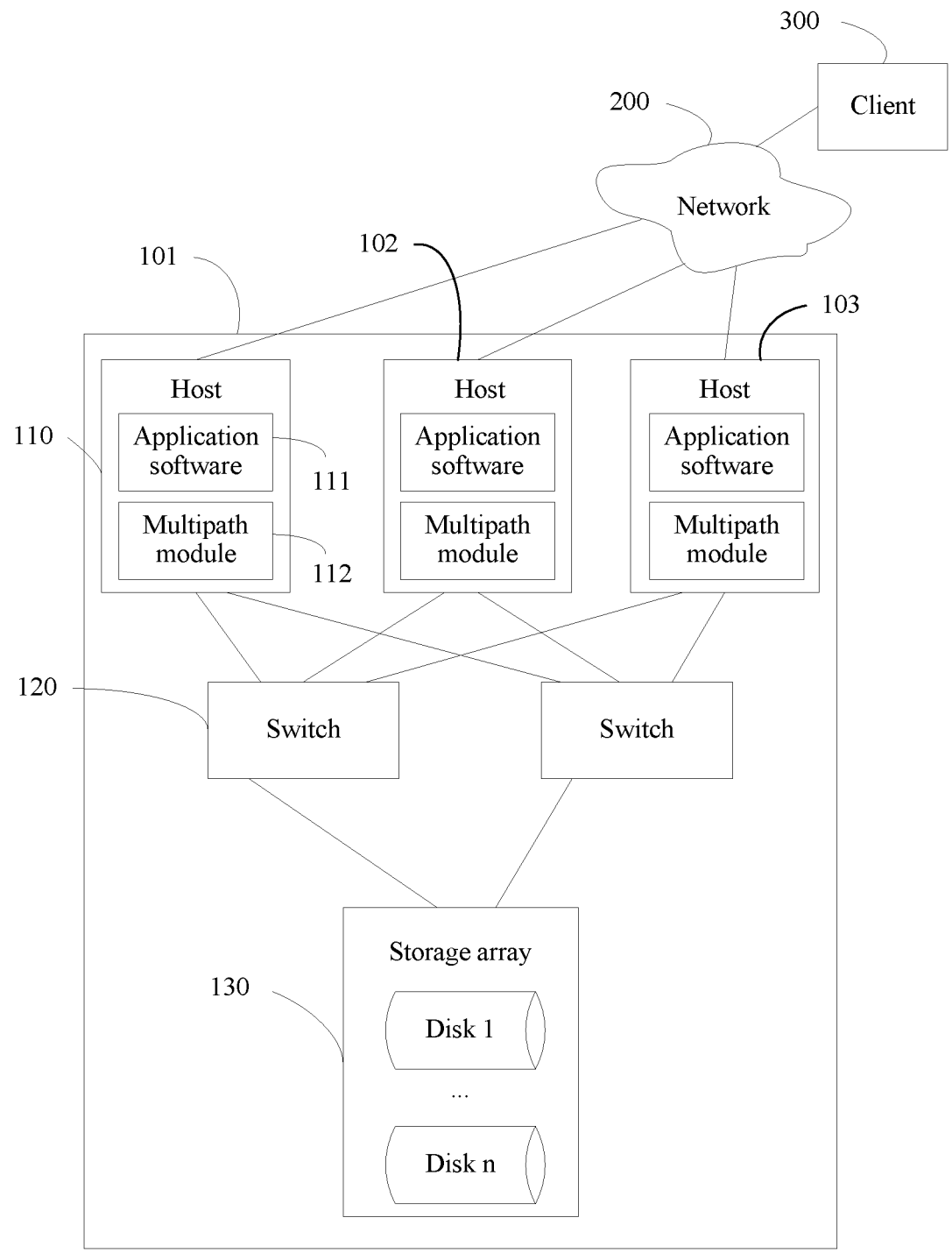
FIG. 1 is an architectural diagram of a storage system to which an embodiment of the present application is applied.

As shown in FIG. 1, FIG. 1 is an architectural diagram of a storage system 100 to which an embodiment of the present application is applied. In the storage system 100, a plurality of hosts 101, 102, 103 are connected to a storage array 130 by using a switch 120. In this embodiment, structures of the hosts are basically the same. In the following description, the host 101 is used as an example for description. Various types of application software 111 run on the host 101 to provide different application services for a user. The storage array 130 stores service data generated when an application runs on the host. The storage array 130 may be a flash array using a non-volatile memory express (NVMe) interface, or may be a storage array using a small computer system interface (SCSI). A client 300 may be connected to each host by using a network 200 to operate or control the host.

The storage array 130 may be divided into at least one disk, for example, a disk 1 to a disk n, and the storage array 130 may communicate with the host by using different interfaces, for example, an NVMe interface and a SCSI interface. When the storage array 130 is the flash array using the NVMe interface, the host 100 communicates with the storage array 130 by using the NVMe protocol, and the disk may be represented by using a namespace defined in the NVMe protocol. When the storage array 130 is the storage array using the SCSI interface, the host 101 communicates with the storage array 130 by using the SCSI protocol, and the disk may be represented by using a logical unit number (LUN) defined in the SCSI protocol. After disks are obtained through division, the storage array 130 allocates one disk identifier (ID) and one disk code to each disk. The disk identifier may uniquely identify the disk. For example, the disk identifier includes a world wide name (WWN), vendor information (vendor), and product information (product) that are applied to the SCSI protocol, or the disk identifier includes a global unique identifier (GUID), vendor information, and product information that are applied to the NVMe protocol. The disk code is used to distinguish different disks in the storage array, for example, LUN numbers such as an LUN1 and an LUN2 in the SCSI protocol and namespace numbers such as a namespace 1 and a namespace 2 in the NVMe protocol. After the disk identifier and the disk code of the disk are allocated, the storage array 130 configures a mapping relationship between the disk and the host. Specifically, the storage array 130 configures a mapping relationship between the disk code and host port information (for example, HBA card port information), and the host to which the disk belongs may be determined based on the mapping relationship.

The host 101 further includes a multipath module 112, and the multipath module 112 may be a software program executed by the host 101. After discovering that a new device is connected, the host 101 manages a disk in the new device by using the multipath module 112, and establishes a path for accessing the disk. A specific method is shown in a flowchart in FIG. 2.

Step S201: When an operating system 114 of a host 101 detects that a storage array 130 is connected to the host 101, the operating system 114 separately sends disk report commands to the storage array 130 by using a plurality of paths between the host 101 and the storage array 130. The disk report command includes host port information for transmitting the disk report command.

Step S202: The storage array 130 receives the disk report command, obtains the host port information in the disk report command, obtains, based on the host port information and a mapping relationship between a disk code and the host port information, the disk code corresponding to the host port, generates report information for a disk corresponding to the disk code, adds the disk code to the report information, and reports the report information to the host 101.

According to a stipulation in a communication protocol between the storage array 130 and the host 101, when the report information passes through a storage array port (not shown in the figure) and a host port (not shown in the figure) in a process of reporting the report information, the storage array port and the host port respectively add an array port ID of the storage array port and a host port ID of the host port to the report information. In this case, the report information includes information about a path used for reporting the report information. For example, if the communication protocol between the host 101 and the storage array 130 is the SCSI protocol, the report command is a report LUN command defined in the SCSI protocol.

Step S203: After receiving the report information, port driver software of the host sets, based on path information in the report information, logical path information for a path used for reporting the report information, adds the logical path information to the report information, and reports, to a multipath module 112, the report information to which the logical path information is added.

When setting the logical path information for the path used for reporting the report information, the port driver software of the host first obtains the disk code in the received report information, and sets the logical path information for the path used for reporting the report information. The logical path information includes a path number and a path pointer. The path number may be determined based on a quantity of times of receiving the report information including the disk code. For example, if the report information is received for the first time, the path number is set to a path 1, and if the report information is received for the second time, the path number is set to a path 2. The path pointer points to the information about the path used for reporting the report information. The path information includes the array port ID and the host port ID in the report information. After the path number is set, the path number may be used to identify the path used for reporting the report information.

Step S204: The multipath module 112 receives the report information, and obtains the logical path information in the report information.

Step S205: The multipath module 112 sends a disk identifier query command by using a path determined based on the logical path information. The query command includes the disk code in the report information.

Step S206: The storage array 130 receives the query command, obtains, based on the disk code in the query command, a disk identifier corresponding to the disk code, and reports, by using the path for sending the query command, the disk identifier corresponding to the disk code.

Because the storage array 130 allocates a disk identifier and a disk code to each disk when creating the disk, the storage array 130 may obtain the disk identifier based on the disk code after receiving the disk code.

Step S207: The multipath module 112 determines, based on the reported disk identifier, a path for accessing a disk corresponding to the disk identifier, and manages the determined path.

Specifically, when receiving another disk identifier for the first time different from the disk identifier received before, the multipath module 112 may create a disk object based on the disk identifier, including allocating a disk object name to the disk object, establishing a mapping relationship between the disk object name and the disk identifier, and recording a path used for reporting the disk identifier as a path of the disk object. Further, other information about the disk may be further recorded in the disk object, such as address space and a capacity size. If the same disk identifier is subsequently received, a path for subsequently reporting the disk identifier may be recorded as another path of the disk object. In this way, the multipath module 112 may manage, by using the disk object, a plurality of paths for accessing the disk, for example, discovering a new path, deleting a disconnected path, and selecting, according to a preset policy, a path for delivering an I/O request. The preset policy may be a preset path priority, load balancing of each path, or the like.

For example, if the multipath module first receives a disk identifier of a disk whose disk code is an LUN1 in a path 1, the multipath module creates a disk object for the LUN1, allocates a disk object name sda to the disk object, establishes a mapping relationship between sda and the disk identifier, and records the path 1 as a first path of the disk object. If the disk identifier of the LUN1 is subsequently received in a path 2 and a path 3, the path 2 and the path 3 are also recorded as paths of the disk object.

After the multipath module 112 manages a path for accessing a disk in the storage array 130, the multipath module may deliver, to the storage array 130 by using the path, an I/O request delivered by the host, and the storage array reads and writes data in the disk.

When an old storage array needs to be replaced with a new storage array, data in the old storage array needs to be migrated to the new storage array. In the prior art, when the new storage array and the old storage array are homogeneous storage arrays, online data migration can be implemented. A specific method is as follows: An image disk of a to-be-migrated disk in the old storage array is created in the new storage array, and the multipath module of the host obtains a disk identifier of the image disk. The disk identifier includes a vendor code. The multipath module determines, based on the vendor code in the obtained disk identifier of the image disk, whether to manage the image disk. If the vendor code in the disk identifier is a vendor code preset in the multipath module, the multipath module may identify the image disk as a disk in a storage array that is homogeneous to a current storage array. The multipath module may manage the image disk, and set a path used for reporting the disk identifier of the image disk as a path for accessing the image disk. To transfer an I/O request of the old storage array to the new storage array, the multipath module aggregates the to-be-migrated disk and the image disk into one aggregation disk, and sets both a path for accessing the to-be-migrated disk and the path for accessing the image disk as access paths of the aggregation disk. In this way, all I/O requests for accessing the to-be-migrated disk are delivered to the aggregation disk. In addition, the multipath module sets the path for accessing the image disk as a preferential access path of the aggregation disk, so that the I/O request delivered to the aggregation disk is delivered to the image disk by using the path for accessing the image disk.

The multipath module is usually provided by an array vendor, and a vendor code of the array vendor is usually preset in the multipath module. Therefore, the multipath module can usually identify only a storage array of the vendor. However, if the new storage array and the old storage array are heterogeneous storage arrays, because a multipath module provided by a vendor of the old storage array is installed on the host, the image disk created in the new storage array usually cannot be identified. Therefore, the I/O request cannot be transferred to the new storage array, and the I/O request of the old storage array can be sent to the new storage array for processing only after a client service running on the host stops and the old storage array is disconnected from the host. The new storage array is configured after processing of the I/O request is completed, and the client service is started based on the new storage array, that is, online data migration cannot be implemented.

Figure 3:
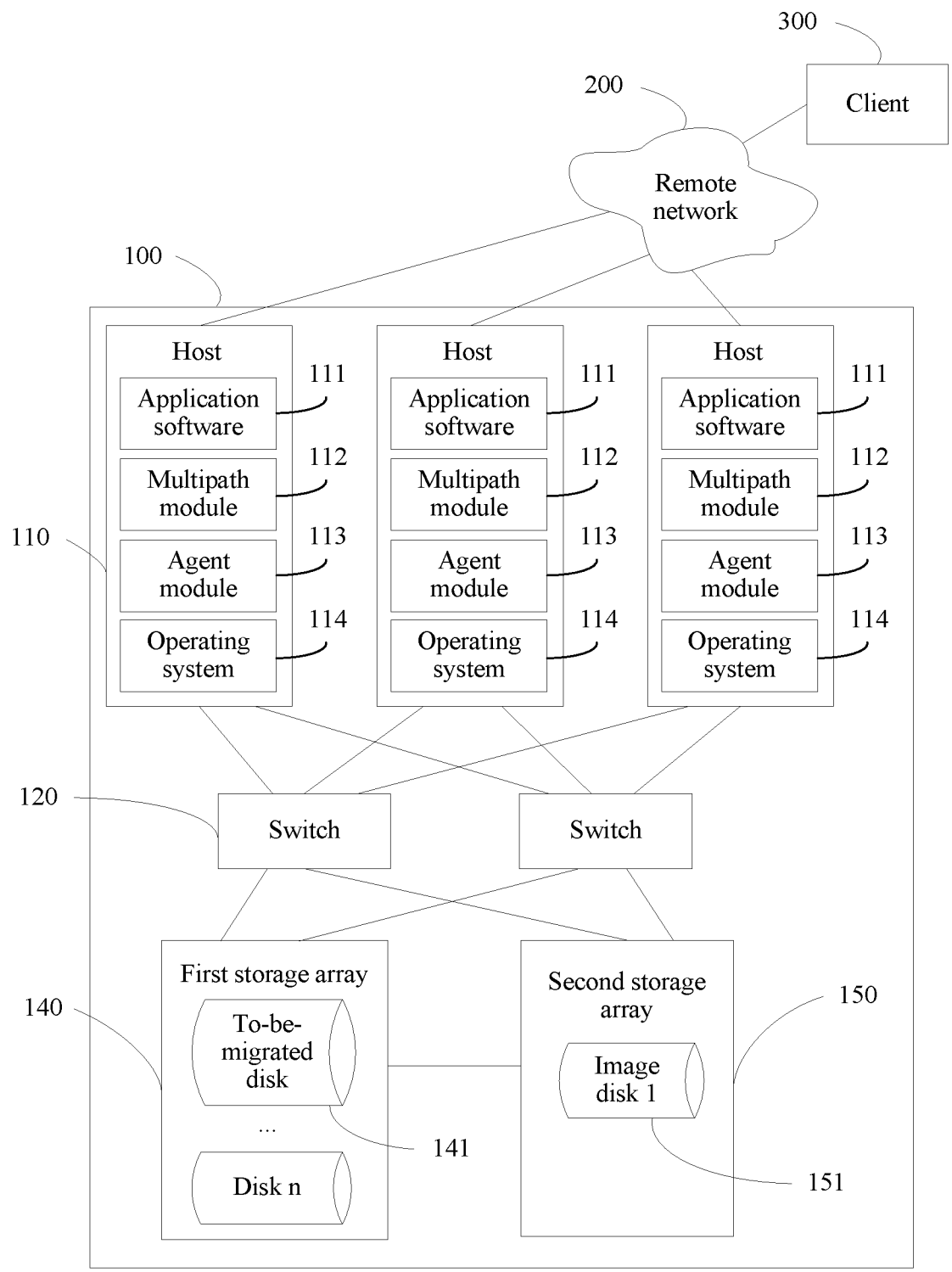
FIG. 3 is a schematic diagram of a storage system obtained after a new storage array is connected to a storage system when data in an old storage array needs to be migrated.

In this embodiment of the present application, when the I/O request in the old storage array is sent to the new storage array for processing that is heterogeneous to the old storage array, the service on the host does not need to stop, but the service on the host is delivered to the new storage array to implement online data migration between the heterogeneous storage arrays. FIG. 3 is a schematic diagram of a storage system obtained after a new storage array is connected to a storage system when data in an old storage array needs to be migrated. A first storage array 140 is an old storage array, and a multipath module 112 installed on a host has managed a path for accessing a to-be-migrated disk 141 in the first storage array 140. A second storage array 150 is a new storage array, and the first storage array 140 is communicatively connected to the second storage array 150. A communication protocol between the two storage arrays may be the NVNe protocol or the SCSI protocol. An agent module 113 is installed on the host 101 before the second storage array 150 is connected to the host 101. The agent module 113 is a software program executed by the host, and is located at a lower layer of the multipath module 112. That is, when the host 101 interacts with the second storage array 150 by using the multipath module 112, interaction needs to be performed by using the agent module 113 first, and the host 101 needs to run the agent module 113 to implement online processing on an I/O request between heterogeneous storage arrays without changing the existing multipath module 112. For a specific method, refer to descriptions of FIG. 4A and FIG. 4B.

Figure 4A:
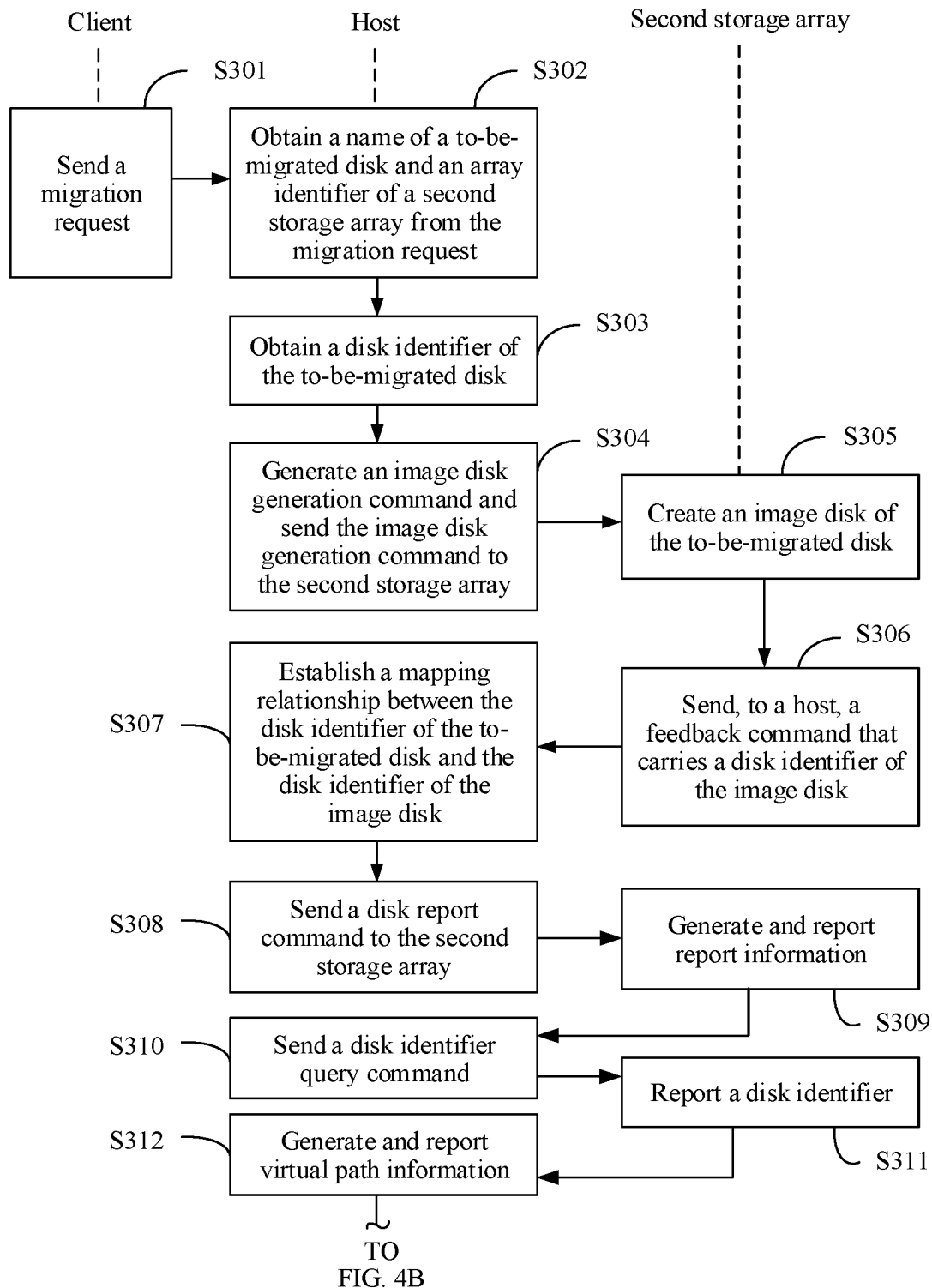
FIG. 4A and FIG. 4B are a flowchart of a method for migrating data in a first storage array in FIG. 3 to a second storage array according to Embodiment 1 of the present application.
Figure 4B:
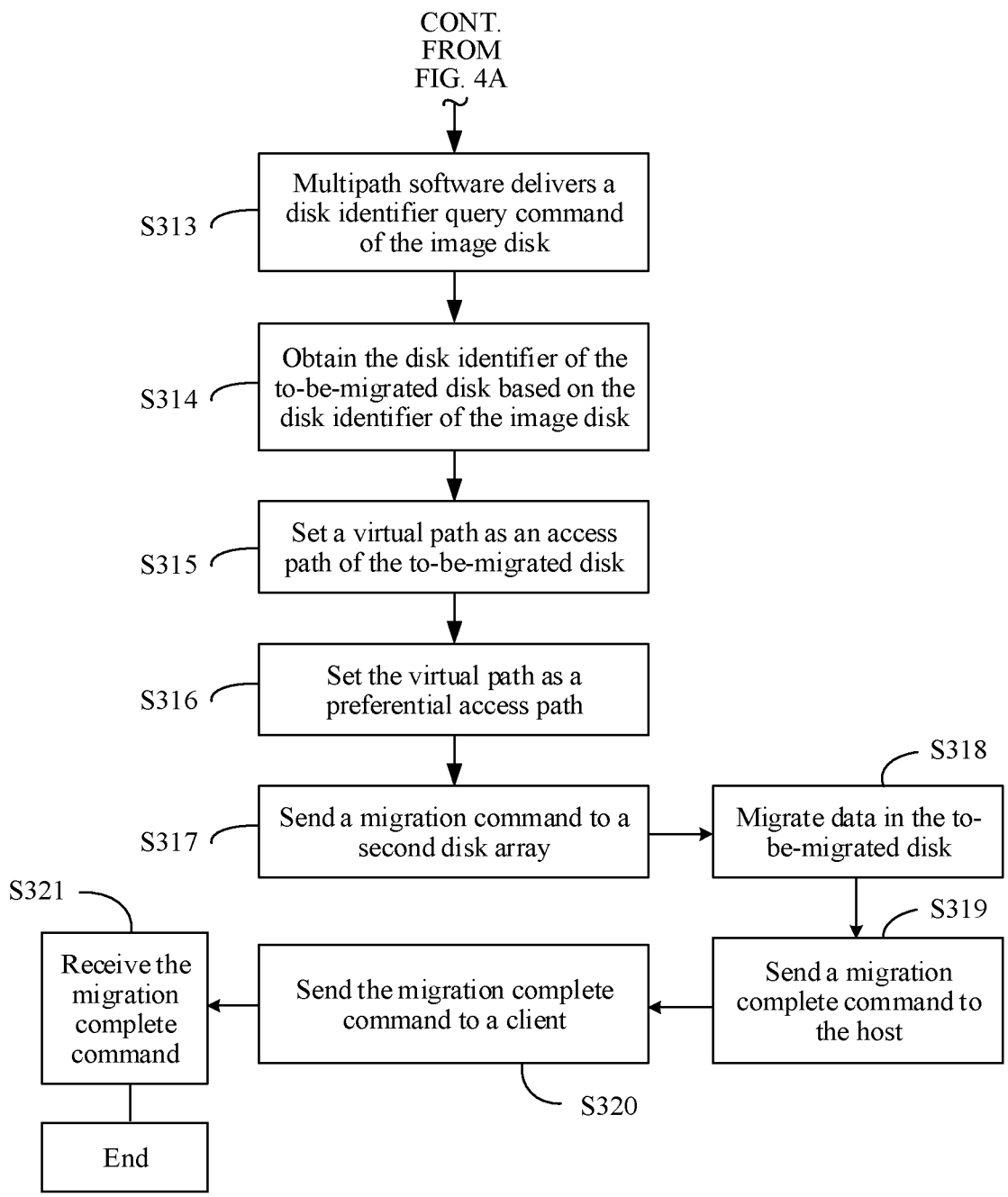

With reference to a flowchart shown in FIG. 4A and FIG. 4B, the following describes a method for processing an I/O request between heterogeneous storage arrays according to Embodiment 1 of the present application.

First, in step S301, a user selects, by using a client 300, a disk that needs to be migrated, namely, a to-be-migrated disk 141, and a target storage array of data migrated to the to-be-migrated disk, and sends a migration request to a host 101 to which the to-be-migrated disk belongs. In this embodiment, the target storage array is a second storage array 150. The migration request includes a disk name of the to-be-migrated disk 141 and an array identifier of the second storage array 150, and the array identifier is used to uniquely identify the second storage array 150.

When the client 300 is connected to the host 101 by using a network 200, the client 300 obtains and stores information about the host 101 and information about a disk of the host 101, so that the user can select the to-be-migrated disk by using a display interface provided by the client 300.

Figure 5:
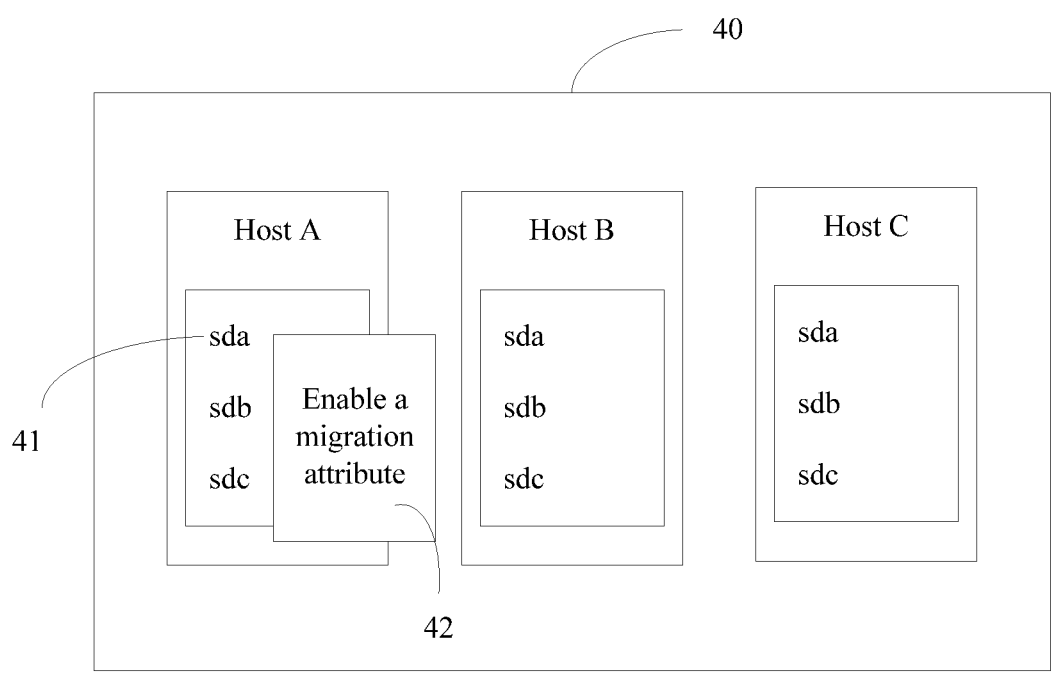
FIG. 5 is a schematic diagram of an interface provided by a client for a user for selecting a to-be-migrated disk according to an embodiment of the present application.

As shown in FIG. 5, a display interface 40 of the client 300 displays a disk name 41 of a disk of each host 101. The user selects the corresponding disk name 41 to select the to-be-migrated disk 141 represented by the disk name 41, clicks a migration button 42 provided by a system to generate the migration request, adds the name 41 such as sdb of the to-be-migrated disk to the migration request, and sends the migration request to the host 101 to which the to-be-migrated disk belongs. The interface shown in FIG. 5 is merely an example for description. Different systems may use different interfaces to display hosts 101 and disks of the hosts 101 in storage systems.

The client 300 and the second storage array 150 are also connected by using the network, so that the client 300 can obtain the array identifier of the second storage array 150 from the second storage array 150.

Step S302: An agent module 113 obtains a disk name of the to-be-migrated disk 141 and an array identifier of a second storage array 150 from the migration request after detecting that the host 101 receives the migration request.

Step S303: The agent module 113 obtains a disk identifier of the to-be-migrated disk 141 based on the disk name of the to-be-migrated disk 141.

Figure 2:
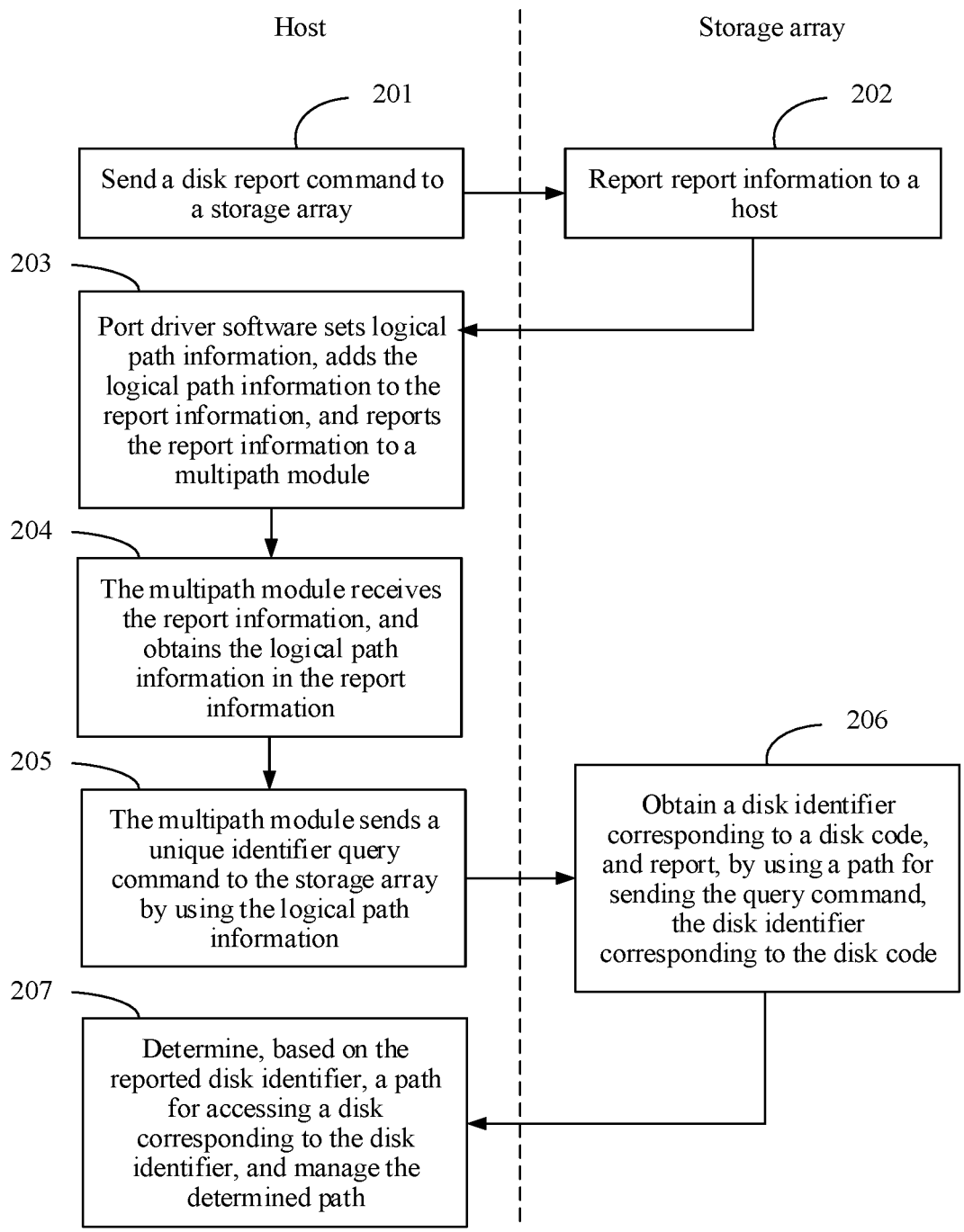
FIG. 2 is a flowchart of a method for managing an access path of a disk in a storage array in FIG. 1 by a multipath module of a host in FIG. 1

As described in step S206 in FIG. 2, after a storage array reports a disk identifier of a disk, the host 101 generates a disk name for the disk, and establishes a mapping relationship between the disk name and the disk identifier of the disk. In this way, the host 101 can obtain the disk identifier of the to-be-migrated disk 141 after obtaining the disk name of the to-be-migrated disk 141.

Step S304: The agent module 113 generates an image disk generation command, adds the disk identifier of the to-be-migrated disk to the image disk generation command, and sends the image disk generation command to the second storage array 150 determined based on the array identifier of the second storage array.

Generally, communication protocols between the host and the storage array include the SCSI protocol and the NVMe protocol, and all these protocols include a private command. The user may customize the private command. In this embodiment, the user may define the private command as the image disk generation command and add the disk identifier of the to-be-migrated disk to the image disk generation command.

As shown in FIG. 6, FIG. 6 is a description table of an image disk generation command defined by using a private command Query VPD Page 0xC8 in the SCSI protocol.

The description table includes a name, a function, a command parameter, and a buffer that are of the private command. For example, the private command whose name is Query VPD Page 0xC8 in the SCSI protocol is used in this embodiment. In a function column of the description table, the function of the private command may be described as a function of instructing a target array to generate an image disk. The parameter part uses bytes to define the function implemented by the private command, and a value herein is negotiated by two communication parties in advance. That is, after receiving the private command, a peer end (for example, the second storage array) may identify, based on a value of a command descriptor block (CDB) in the parameter part, the executed function indicated by the private command. For example, in this embodiment, a value 0x12 of a command descriptor block CDB[0] is used to indicate that the private command is an query command in a SCSI command set, and a value 0xc8 of a command descriptor block CDB[2] is used to instruct a target array to generate an image disk. The buffer includes two portions: an information sending portion and an information returning portion. The information sending portion is used to write information carried in the private command. In this embodiment, the private command carries the disk identifier of the to-be-migrated disk, and the carried identifier of the to-be-migrated disk may be written to the information sending portion of the buffer. For example, the disk identifier of the to-be-migrated disk includes: a vendor ID of the to-be-migrated disk, a value AAA, and a byte 0; a product name of the to-be-migrated disk, a value BBB, and a byte 1; and a WWN of the to-be-migrated disk, XXXXXXXXX, and bytes 3 to 66. The information returning portion is used to write a disk identifier of an image disk of the to-be-migrated disk after the second storage array creates the image disk. For details, refer to descriptions of step S306.

Step S305: After receiving the image disk generation command, the second storage array 150 obtains the disk identifier of the to-be-migrated disk carried in the image disk generation command, creates an image disk 151 of the to-be-migrated disk 141 (a process of creating the image disk of the to-be-migrated disk 141 based on the disk identifier of the to-be-migrated disk is described below), and allocates a disk identifier, a disk code, and a host port to the image disk 151.

A first storage array 140 and the second storage array 150 may communicate with each other by using the SCSI protocol or the NVMe protocol. The second storage array 150 sends a disk report command to the first storage array 140 when the second storage array 150 creates the image disk of the to-be-migrated disk 141. After receiving the disk report command, the first storage array 140 generates one piece of report information for each disk in the first storage array 140, adds a disk code of the corresponding disk to each piece of report information, and reports each piece of report information to the second storage array 150. In a process of reporting the report information, a first array port and a second array port through which the report information passes add respective port IDs to the report information, and generate path information of a path used for reporting the report information. The second storage array 150 sends a disk identifier query command to the first storage array 140 by using the path indicated by the path information. The query command includes a disk code in the path information. The first storage array 140 obtains, based on the disk code in the query command, a disk identifier corresponding to the disk code, and sends the disk identifier to the second storage array 150 by using the path indicated by the path information. If the disk identifier reported by the first storage array 140 is the same as a disk identifier that is of the to-be-migrated disk and that is prestored in the second storage array 150, the second storage array 150 manages a path used for reporting the disk identifier of the to-be-migrated disk as a path for accessing the to-be-migrated disk. After the second storage array 150 manages the path for accessing the to-be-migrated disk, the second storage array 150 can obtain information about the to-be-migrated disk 141, for example, a disk size and address space, and then create the image disk 151 of the to-be-migrated disk in the second storage array 150 based on the information. A size of the created image disk 151 may be greater than or equal to that of the to-be-migrated disk. A manner in which the second storage array 150 creates the image disk based on disk information of the to-be-migrated disk is the same as that in the prior art, and details are not described herein.

Step S306: After completing creation of the image disk, the second storage array 150 adds the disk identifier of the image disk 151 to a feedback command of the image disk generation command, and sends the feedback command to the host 101.

As shown in FIG. 6, the buffer in the private command further includes the information returning portion. After completing creation of the image disk, the second storage array writes the disk identifier of the image disk to the information returning portion. For example, vendor information CCC of the image disk is written to a byte 67, product information DDD of the image disk is written to a byte 68, and a WWN of the image disk is written to bytes 69 to 132. After the disk identifier of the image disk is written to the private command, a feedback command of the private command is generated, and the feedback command is sent to the host.

Step S307: After receiving the feedback command, the agent module 113 obtains the disk identifier of the image disk 151, and establishes a mapping relationship between the disk identifier of the to-be-migrated disk 141 and the disk identifier of the image disk 151. For ease of description, the mapping relationship herein is referred to as a disk identifier mapping relationship below.

Step S308: After establishing the disk identifier mapping relationship, the agent module 113 triggers an operating system 114 to send a disk report command by using one or more paths between the host 101 and the second storage array 150. The disk report command includes host port information for transmitting the disk report command.

Generally, when a storage array is connected to the host, or a hard disk is inserted into or unplugged from a storage array connected to the host, the operating system 114 of the host sends a disk report command to the storage array to update an access path of a disk of the host. In this embodiment, after establishing the disk identifier mapping relationship, the agent module 113 triggers the operating system 114 to send the disk report command to the second storage array by using one or more paths between the host 101 and the second storage array 150.

Step S309: After receiving the disk report command, the second storage array 150 obtains the host port information in the disk report command, inquires a mapping relationship between a disk code and the host port information to obtain the disk code corresponding to the host port, generates report information for a disk corresponding to the disk code, adds the disk code to the report information, and reports the generated report information to the host 101. The path information of the path used for reporting the report information is generated in a process of reporting the report information. For details, refer to descriptions of steps S203 and S204 in FIG. 2.

When there are a plurality of paths between the host 101 and the second storage array 150, the host 101 sends the disk report command to the second storage array 150 by using the plurality of paths. Each time when receiving a disk report command, the second storage array 150 generates one piece of report information based on the received disk report command.

Step S310: The agent module 113 receives the report information, obtains and records path information in the report information, and sends a disk identifier query command to the second storage array 150 by using a path determined based on the path information. The disk identifier query command carries the disk code in the report information.

The path information herein is the logical path information described in step S203 in FIG. 2.

In the prior art, because the agent module is not installed, the report information is directly reported to a multipath module, and the multipath module sends the disk identifier query command to the second storage array based on the report information. However, in this embodiment, because the agent module is installed at a lower layer of the multipath module, the report information is intercepted by the agent module. After intercepting the report information, the agent module sends the disk identifier query command to the second storage array 150.

Step S311: After receiving the disk identifier query command, the second storage array 150 obtains, based on the disk code carried in the disk identifier query command, a disk identifier corresponding to the disk code, and reports the disk identifier to the agent module S113 by using the path for sending the query command.

In the prior art, the disk identifier is directly reported to the multipath module. However, in this embodiment, because the agent module exists, the disk identifier is also reported to the agent module.

Step S312: If determining that the reported disk identifier exists in the disk identifier mapping relationship, the agent module 113 considers the reported disk identifier as the disk identifier of the image disk, sets virtual path information for a path used for reporting the disk identifier of the image disk (a logical path corresponding to the logical path information described in step S203 in FIG. 2, and referred to as a "disk identifier report path" below), and reports the specified virtual path information to the multipath module 112.

As described in step S308, after establishing the disk identifier mapping relationship, the agent module 113 triggers the operating system 114 to send the disk report command to the second storage array 150. Therefore, the disk identifier received by the agent module 113 is a disk identifier of a disk in the second storage array 150. As long as the reported disk identifier exists in the disk identifier mapping relationship, it may be considered that the reported disk identifier is a target disk for current migration, that is, the disk identifier of the image disk.

The virtual path information includes a path number, a path pointer, and a disk code. The path number is specified by the agent module 113, and may be the same as or different from a path number of a path used for reporting the disk code of the image disk. The path pointer points to path information that is of the disk identifier report path and that is recorded in the agent module 113. The disk code is the disk code of the image disk.

Step S313: After receiving the virtual path information, the multipath module 112 delivers a disk identifier query command of the image disk to the agent module by using a virtual path determined based on the virtual path information. The disk identifier query command includes the disk code of the image disk.

Because the virtual path information includes the path pointer, and the path pointer points to the path information that is of the disk identifier report path and that is recorded in the agent module, the multipath module 112 sends the disk identifier query command to the agent module 113.

In this embodiment, the multipath module receives information reported by the agent module, the reported information includes the virtual path information, and the path pointer in the virtual path information points to the agent module. Therefore, the disk identifier query command is sent to the agent module, but is not sent to the second storage array as the prior art.

Step S314: After receiving the disk identifier query command, the agent module 113 obtains the disk code of the image disk carried in the disk identifier query command, obtains the disk identifier of the image disk based on the disk code of the image disk, obtains the disk identifier of the to-be-migrated disk 141 based on the disk identifier mapping relationship established in step S307, and reports the disk identifier of the to-be-migrated disk to the multipath module 112.

Step S315: After obtaining the disk identifier of the to-be-migrated disk, the multipath module 112 sets the path indicated by the virtual path information as an access path of the to-be-migrated disk.

It should be noted that, when subsequently inquiring the identifier of the image disk by using the virtual path indicated by the virtual path information, the host 101 also returns the disk identifier of the to-be-migrated disk.

Step S316: The multipath module 112 sets the virtual path as a preferential access path.

Generally, both the multipath module and the system of the host have a function of setting a path priority. When reporting the identifier of the to-be-migrated disk, the agent module 113 herein may further add an instruction for setting the virtual path as the preferential access path. The multipath module 112 may set the virtual path as the preferential access path according to the instruction, and an image disk accessed by using the preferential access path is a preferential access disk.

After the virtual path is set as the preferential access path, when the host 101 receives an I/O request, the multipath module 112 delivers the I/O request to the agent module 113 by using the path pointer in the virtual path information. The agent module 113 finds, based on the path pointer, the disk identifier report path to which the virtual path points, and delivers the I/O request to the second storage array 150 by using an actual path. The second storage array 150 accesses data in the image disk 151 based on the I/O request. This ensures that a service on the host 101 is not interrupted when the second storage array 150 subsequently processes the I/O request of the to-be-migrated disk 141.

It should be noted that, if the path for accessing the image disk is interrupted in a process of delivering the I/O request by using the virtual path, the multipath module 112 delivers the I/O request by using the path for accessing the to-be-migrated disk. After the path for accessing the image disk is recovered or after the virtual path is re-established, the I/O request is delivered by using the newly-established virtual path, and migration of data in the to-be-migrated disk restarts.

Figure 7:
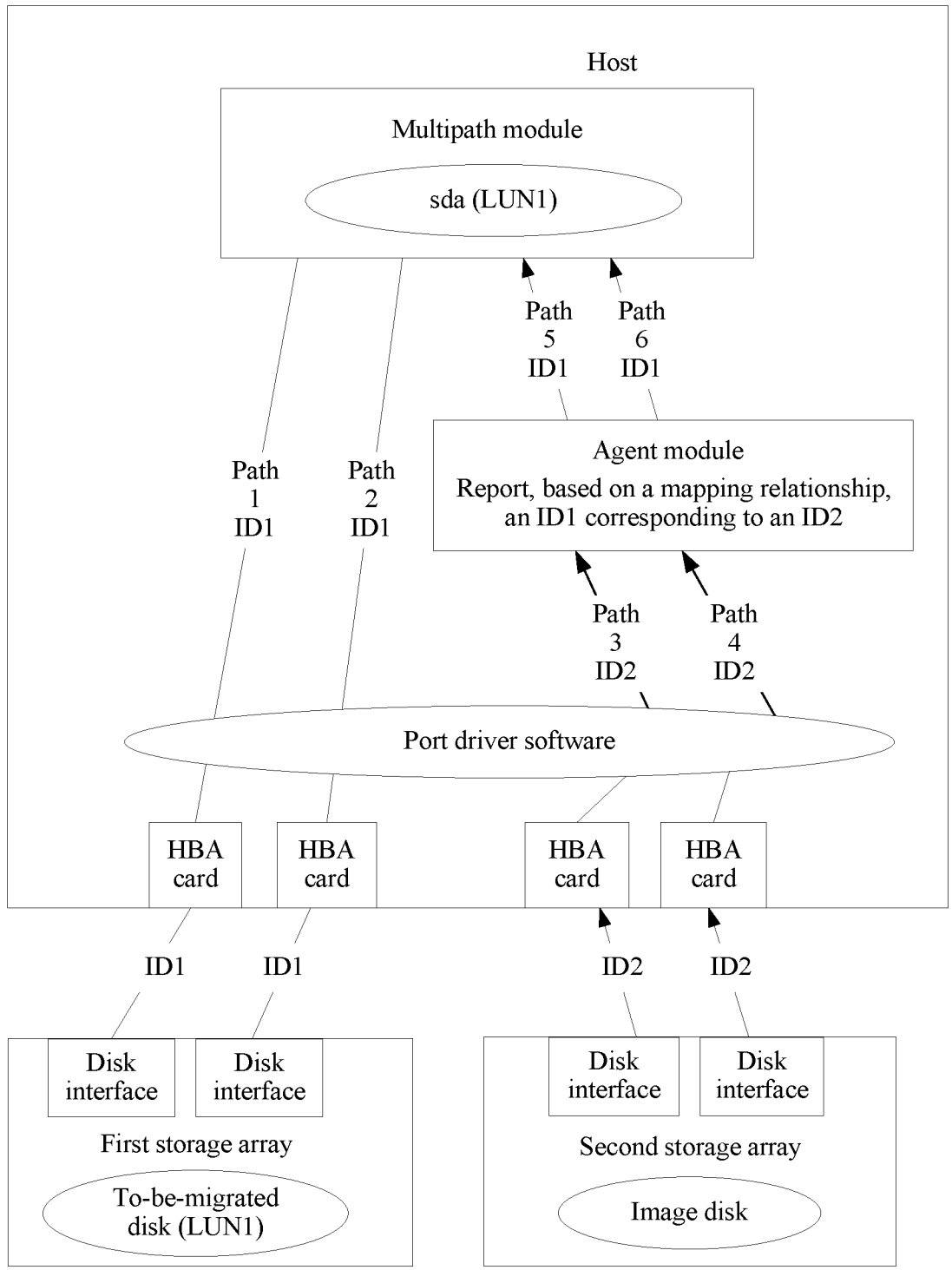
FIG. 7 is a schematic diagram of a process for establishing a virtual path according to an embodiment of the present application.

Further, for a process of establishing the virtual path, refer to an example shown in FIG. 7.

For example, before the I/O request of the to-be-migrated disk in the first storage array is processed, the host is connected only to the first storage array, and the agent module is not installed on the host. Therefore, in the method shown in FIG. 2, because the multipath module receives the disk identifier (ID1) of the to-be-migrated disk in a path 1 and a path 2, the multipath module uses the path 1 and the path 2 as paths for accessing the to-be-migrated disk. When the I/O request of the to-be-migrated disk needs to be sent to the second storage array for processing, the second storage array is connected to the host, and the agent module is installed on the host as lower layer software of the multipath module. The agent module may be installed on the host before the second storage array is connected to the host, or may be installed on the host after the second storage array is connected to the host. After the second storage array creates the image disk of the to-be-migrated disk in steps S302 to S305 in FIG. 3, the second storage array returns the disk identifier of the image disk to the host. The agent module of the host establishes the mapping relationship between the disk identifier of the to-be-migrated disk and the disk identifier of the image disk. After establishing the mapping relationship, the agent module triggers the operating system of the host to send the disk report command to the second storage array.

The second storage array first sends the report information to port driver software. The port driver software successively receives the report information reported by the second storage array, and generates corresponding logical path information for each piece of report information based on the received report information. The logical path information includes a path code and a path pointer that are allocated to a logical path. Path codes allocated to a same disk are not repeated. In this embodiment, if the port driver software receives report information including the disk code of the image disk twice, path codes such as path 3 and a path 4 are separately allocated to paths that are for reporting the report information including the disk code of the image disk, and path information of the two logical paths is reported to the agent module. After receiving the information about the two logical paths, the agent module sends, to the second storage array by using the path 3 and the path 4 indicated by the information about the two logical paths, the disk identifier query command that carries the disk code. The second storage array obtains the disk identifier based on the disk code in the disk query command, and sends the disk identifier (represented by a WWN2 in the figure for briefness) to the agent module. If determining that the disk identifier exists in the previously specified mapping relationship between the disk identifier of the to-be-migrated disk and the disk identifier of the image disk, the agent module separately sets virtual paths that are a path 5 and a path 6 for the path 3 and the path 4. Path information of the virtual path 5 and path information of the virtual path 6 include path pointers that separately point to the path 3 and the path 4, and further include the disk code of the to-be-migrated disk. The agent module reports the path information of the path 5 and the path information of the path 6 to the multipath module. After receiving the path information of the path 5 and the path information of the path 6, the multipath module sends, to the agent module by using the path 5 and the path 6, the disk identifier query command that carries the disk code of the image disk. After receiving the query command, the agent module obtains the disk identifier corresponding to the disk code of the image disk, obtains the disk identifier of the to-be-migrated disk based on the disk identifier mapping relationship, and reports the disk identifier of the to-be-migrated disk to the multipath module by using the path 5 and the path 6. After receiving the disk identifier of the to-be-migrated disk, the multipath module may set the path 5 and the path 6 as access paths of the to-be-migrated disk, and use the path 5 and the path 6 as preferential access paths.

Step S317: The agent module 113 sends a migration command to the second storage array 150, and adds the disk identifier of the image disk 151 to the migration command.

In another embodiment, the migration command may carry both the identifier of the to-be-migrated disk and the identifier of the image disk, or carry only the identifier of the to-be-migrated disk.

Step S318: After receiving the migration command of the host 101, the second storage array 150 obtains, based on the disk identifier of the image disk 151, the disk identifier of the to-be-migrated disk 140 corresponding to the image disk 151. Because the second storage array establishes the access path of the to-be-migrated disk when creating the image disk 151 of the to-be-migrated disk 141, the second storage array may directly access the to-be-migrated disk and send the I/O request of the to-be-migrated disk to the image disk 151 for processing.

It should be noted herein that an operation in which the host sends the migration command to the second storage array to instruct the second storage array to process the I/O request may be performed before establishment of the virtual path is completed. If the I/O request processing operation is performed before establishment of the virtual path is completed, a buffer needs to be set in the first storage array, and the buffer is used to store an I/O request delivered to the first storage array. After establishment of the virtual path is completed, the I/O request stored in the buffer is forwarded to the second storage array for execution.

Step S319: After processing of the I/O request of the to-be-migrated disk 141 is completed, the second storage array 150 feeds back a migration complete command to the host 101.

Step S320: The host 101 returns, to the client 300, the migration complete command that is fed back. When feeding back the migration complete command, the host may add the disk name of the to-be-migrated disk to the migration complete command.

Step S321: If the client receives the migration complete command, a procedure of processing the I/O request of the to-be-migrated disk ends.

In the embodiment described in FIG. 4A and FIG. 4B, the agent module is installed at the lower layer of the multipath module. In the prior art, report information that is reported to the multipath module and that is used to report a disk code in the second storage array is intercepted by the agent module. The agent module further inquires, based on the received report information, a disk identifier of a disk that is in the second storage array and that is of the host, identifies the disk identifier of the image disk from the reported disk identifier, sets the virtual path information for the path used for reporting the image disk, and reports the disk code of the image disk and the virtual path information to the multipath module. The virtual path information points to the agent module. In the prior art, the path information in the report information received by the multipath module is information about a path from the second storage array to the multipath module. Therefore, the multipath module sends the disk identifier query command to the second storage array. However, in this embodiment, because the virtual path information is reported to the multipath module, the multipath module sends the disk identifier query command to the agent module by using the virtual path indicated by the virtual path information. The agent module obtains the disk identifier of the to-be-migrated disk based on the disk identifier that is of the image disk and that is inquired by the multipath module, and reports the disk identifier of the to-be-migrated disk to the multipath module. In this way, the multipath module can manage the virtual path as a path of the to-be-migrated disk, and after setting the virtual path as the preferential access path, the multipath module may deliver the I/O request received by the host to the image disk by using the virtual path. In this case, a service on the host does not need to be interrupted when the I/O request of the to-be-migrated disk is sent to the image disk for processing, thereby implementing online data migration.

In Embodiment 2 of the present application, the agent module generates an integrated command in step S304, and the integrated command includes two commands: an image disk generation command and a migration command. The image disk generation command and the migration command are the same as those in Embodiment 1. Execution orders and trigger conditions of the image disk generation command and the migration command are defined in the integrated command. For example, it may be specified that the image disk generation command is executed first, and then the migration command is executed. The execution condition of the migration command is defined as follows: The migration command is executed after the second storage array 150 completes establishment of the virtual path or is executed after a preset time.

After the integrated command is sent to the second storage array 150, the second storage array 150 first executes the image disk generation command, that is, performs steps S305 and S306. If the execution condition that is of the migration command and that is defined in the integrated command is: the migration command is executed after establishment of the virtual path is completed, the multipath module sends a notification command to the second storage array after completing establishment of the virtual path in step S316, and the second storage array may execute the migration command according to the notification command, that is, migrate the data in the to-be-migrated disk. For a specific migration process, refer to descriptions of step S318. If the execution condition that is of the migration command and that is defined in the integrated command is waiting for the preset time, the second storage array starts timing after receiving the integrated command, and starts to execute the migration command when the timing reaches the preset time, to migrate the data in the to-be-migrated disk. When the migration command is being executed, if the virtual path has been established, an I/O request received in the I/O request processing process is directly delivered to the second storage array by using the virtual path; if the virtual path has not been established, an I/O request received in the I/O request processing process is stored in the buffer of the first storage array, and is forwarded to the second storage array after establishment of the virtual path is completed.

Figure 8A:
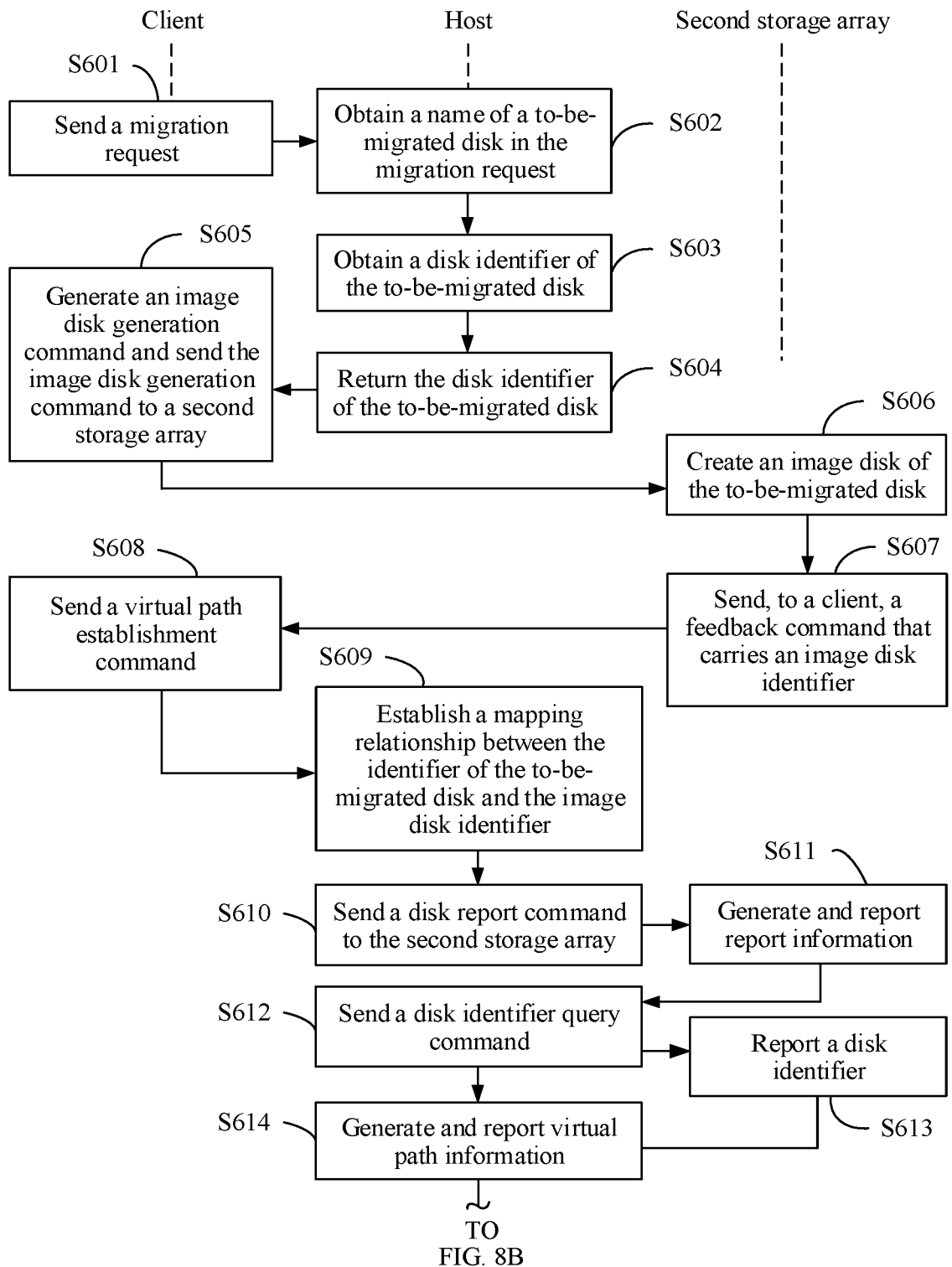
FIG. 8A and FIG. 8B are a flowchart of a method for migrating data in a first storage array to a second storage array according to Embodiment 3 of the present application.
Figure 8B:
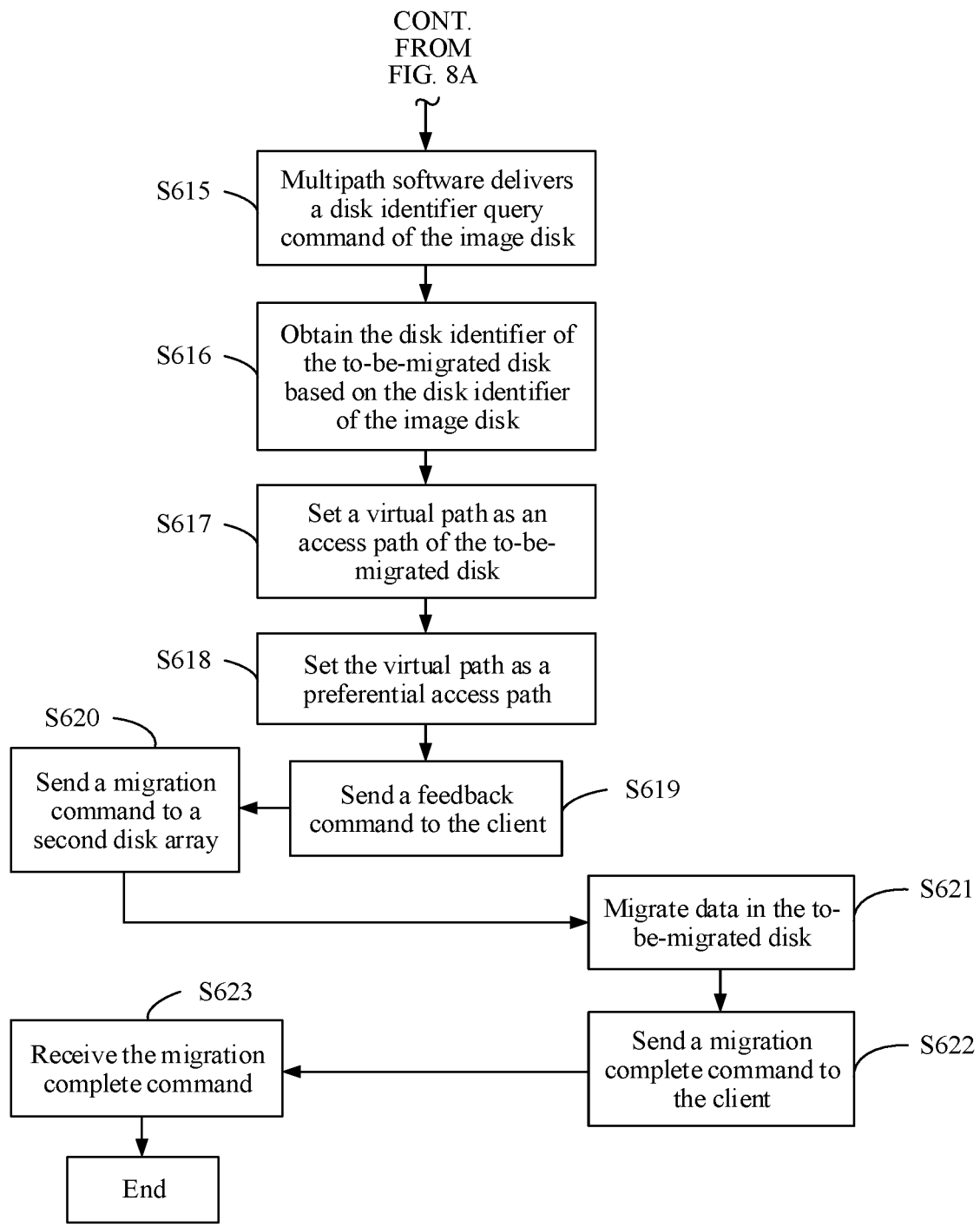

FIG. 8A and FIG. 8B are a flowchart of a method for processing an I/O request between heterogeneous storage arrays according to Embodiment 3 of the present application.

A main difference between Embodiment 3 and Embodiment 1 lies in that, in Embodiment 3, data migration is mainly controlled by a client 300. A specific solution is as follows:

Steps S601 to S603 are the same as steps S301 to S303 in Embodiment 1. Because a process of processing an I/O request is controlled by the client in this embodiment, a host returns a disk identifier of a to-be-migrated disk to the client in step S604 after obtaining the disk identifier of the to-be-migrated disk in step S603.

In step S605, after receiving the disk identifier of the to-be-migrated disk, the client generates an image disk generation command, and directly sends the image disk generation command to a second storage array.

In step S606, the second storage array generates an image disk according to the image disk generation command. A manner of generating the image disk by the second storage array is the same as that in Embodiment 1. For details, refer to step S305 in FIG. 4A.

In step S607, the second storage array sends, to the client, a feedback command that carries an image disk identifier.

In step S608, the client sends, to the host, a command for establishing a virtual path. The command for establishing the virtual path includes the disk identifier of the image disk.

In step S609, an agent module establishes a mapping relationship between the identifier of the to-be-migrated disk and the identifier of the image disk.

Steps S610 to S618 are corresponding to steps S308 to S316 in FIG. 4A and FIG. 4B, and executed functions are the same. For details, refer to related descriptions of FIG. 4A and FIG. 4B. Details are not described herein again.

In step S619, the agent module sends a feedback command to the client.

In step S620, after receiving the feedback command, the client sends a migration command to the second storage array. The migration command carries the disk identifier of the to-be-migrated disk.

In step S621, the second storage array may migrate data in the to-be-migrated disk according to the migration command. For a specific migration process, refer to descriptions of step S318 in FIG. 4B.

In step S622, if completing migration of the data in the to-be-migrated disk, the second storage array sends a migration complete feedback instruction to the client.

In step S623, if the client receives the migration complete feedback instruction, a procedure of processing the I/O request ends.

It should be noted that, if a write request is received in the I/O request processing process, to-be-written data in the write request may be written to the image disk by using an established logical path. When a read request is received, the read request may be delivered to the second storage array by using the logical path. When receiving the read request, the second storage array reads data from the image disk. If the read data has not been migrated from the to-be-migrated disk, the second storage array reads the data from the to-be-migrated disk in the first storage array.

In addition, if new data has been written to a virtual disk in the I/O request processing process, data does not need to be migrated to overwrite the new data that has been written.

Figure 9:
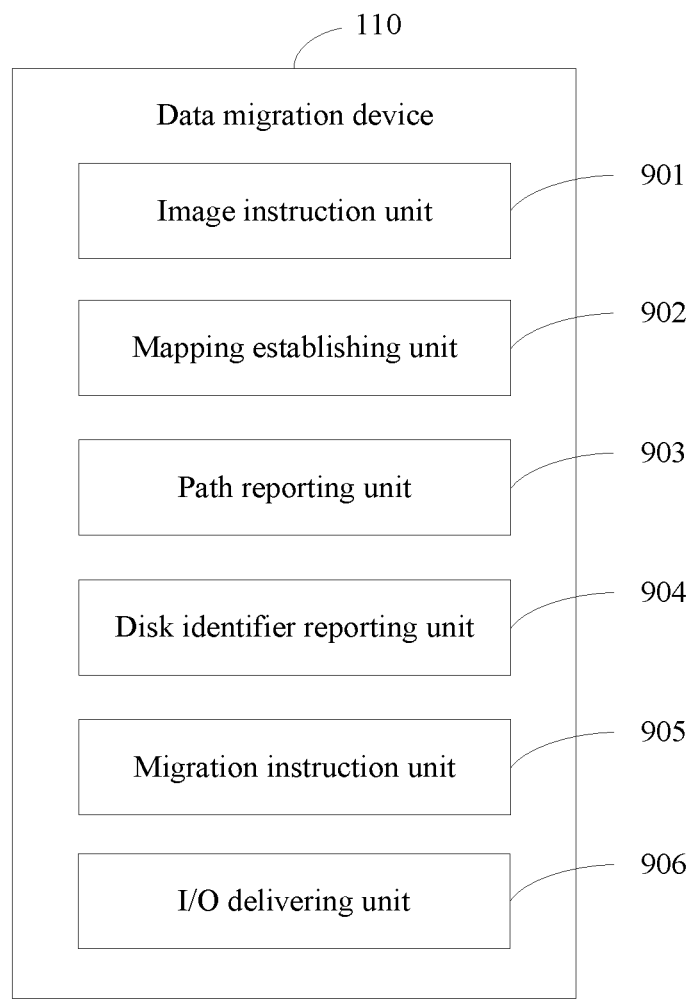
FIG. 9 is a block diagram of a host according to an embodiment of the present application.

FIG. 9 is a functional block diagram corresponding to the host 110 in Embodiment 1 of the present application.

The host 110 includes an image instruction unit 901, a mapping establishing unit 902, a path reporting unit 903, a disk identifier reporting unit 904, a migration instruction unit 905, and an I/O delivering unit 906. The image instruction unit 901 is configured to: obtain a disk name of a to-be-migrated disk and an array identifier of a second storage array from a migration request after detecting that the host receives the migration request, obtain a disk identifier of the to-be-migrated disk based on the disk name of the to-be-migrated disk, generate an image disk generation command, and send the image disk generation command to the second storage array determined based on the array identifier of the second storage array. The image disk generation command carries the disk identifier of the to-be-migrated disk, and is used to instruct the second storage array to create an image disk of the to-be-migrated disk. For details, refer to descriptions of step S301 to S304 in FIG. 4A.

The mapping establishing unit 902 is configured to establish a mapping relationship between the disk identifier of the to-be-migrated disk and a disk identifier of the image disk when receiving the disk identifier of the image disk that is reported after the second storage array creates the image disk (for a manner of creating the image disk, refer to descriptions of steps S305 and S306 in FIG. 4). For details, refer to descriptions of step S307.

The path reporting unit 903 is configured to trigger an operating system to send a disk report command by using one or more paths between the host and the second storage array. After report information generated and reported by the second storage array according to the report command (for a process in which the second storage array generates the report information according to the report command, refer to descriptions of step S309 in FIG. 4A) is received, the path reporting unit 903 obtains and records path information in the report information, and sends a disk identifier query command to the second storage array 150 by using a path determined based on the path information. The disk identifier query command carries a disk code in the report information. After the disk identifier reported by the second storage array (for a process in which the second storage array reports the disk identifier, refer to descriptions of step S311 in FIG. 4A) is received, if the path reporting unit 903 determines that the reported disk identifier exists in the disk identifier mapping relationship, the path reporting unit 903 considers the reported disk identifier as the disk identifier of the image disk, sets virtual path information for a path used for reporting the disk identifier of the image disk (referred to as a "disk identifier report path" below), and reports the specified virtual path information to a multipath module. For details, refer to related descriptions of steps S308, S310, and S312. After receiving the virtual path information reported by the path reporting unit 903, the multipath module sends a disk identifier query command. For details, refer to descriptions of step S313 in FIG. 4B.

The disk identifier reporting unit 904 is configured to: after receiving the disk identifier query command sent by the multipath module, obtain a disk code of the image disk carried in the disk identifier query command, obtain the disk identifier of the image disk based on the disk code of the image disk, replace the disk identifier of the image disk with the disk identifier of the to-be-migrated disk based on the disk identifier mapping relationship, and report the disk identifier of the to-be-migrated disk to the multipath module. For details, refer to descriptions of step S314 in FIG. 4B.

After receiving the disk identifier of the to-be-migrated disk, the multipath module may set a virtual path indicated by the virtual path information as an access path of the to-be-migrated disk, and sets the virtual path as a preferential access path. In this case, when receiving an I/O request delivered by the host, the I/O delivering unit 906 may deliver the I/O request to the second storage array by using the virtual path, and the second storage array executes the I/O request to access data in the image disk. For details, refer to descriptions of step S314 and S315 in FIG. 4B.

The migration instruction unit 905 is configured to send a migration command to the second storage array. The migration command carries the disk identifier of the image disk, and is used to instruct the second storage array to send an I/O request of the to-be-migrated disk to the image disk for processing. For details, refer to descriptions of step S317 in FIG. 4B.

After receiving the migration command, the second storage array may start to migrate data in the to-be-migrated disk. After processing of the I/O request is completed, the second storage array feeds back a migration complete command to the host, and the host continues to feed back the migration complete command to the client, to complete migration of the data in the to-be-migrated disk. For details, refer to descriptions of steps S318 to S321 in FIG. 4B.

It should be noted that, the path reporting unit 903 and the disk identifier reporting unit 904 may be included in one setting module.

Figure 10:
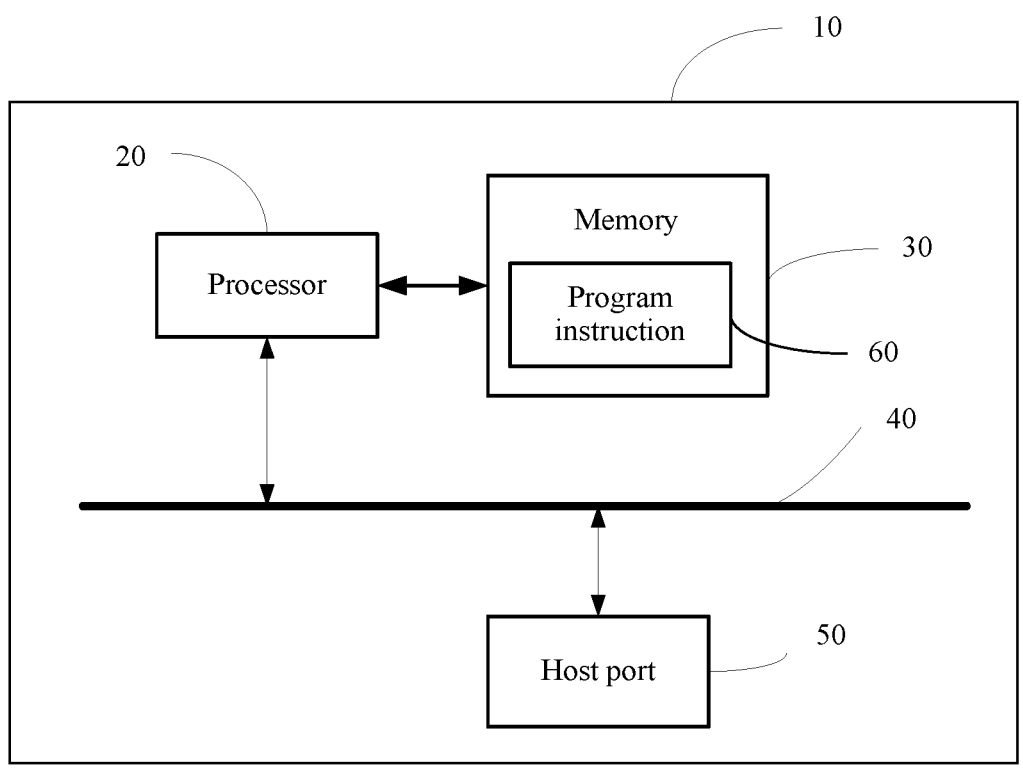
FIG. 10 is a structural diagram of a host according to an embodiment of the present application.

FIG. 10 is a structural diagram of hardware of a host 110 according to an embodiment of the present application. The host includes a processor 20, a memory 30, a system bus 40, and a host port 50. The processor 20, the memory 30, and the host port 50 are connected and communicate with each other by using the system bus 40. The multipath module 112, the agent module 113, and the operating system 114 of the host in FIG. 3 are stored in the memory 30 in a form of program instructions 60.

When the host 110 runs, the processor 20 executes the program instruction in the memory 30 to perform the method procedure shown in FIG. 4A and FIG. 4B.

This embodiment of the present application further provides a computer readable medium, including a program instruction. When the processor of the host executes the program instruction, the host performs the method procedure in FIG. 4A and FIG. 4B.

Figure 11:
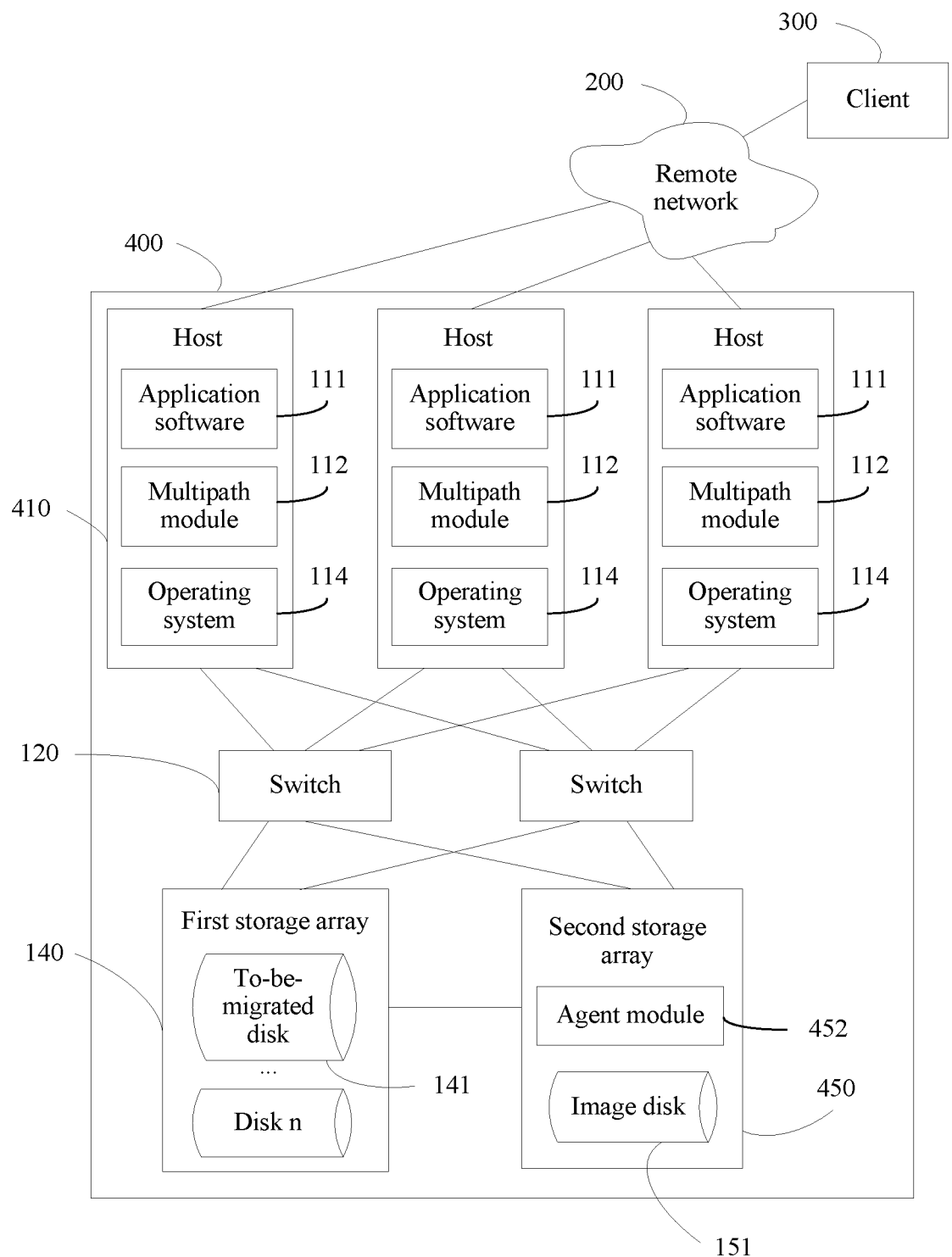
FIG. 11 is a schematic diagram of a storage system according to Embodiment 4 of the present application.

Embodiment 4 of the present application provides a storage system 400. As shown in FIG. 11, a difference between an architecture of the storage system 400 and the storage system 100 in Embodiment 1 lies in that a host 410 in Embodiment 4 does not include an agent module, but a second storage array 450 includes an agent module 452. Other parts are the same as those in Embodiment 1, and are not described herein again.

Figure 12A:
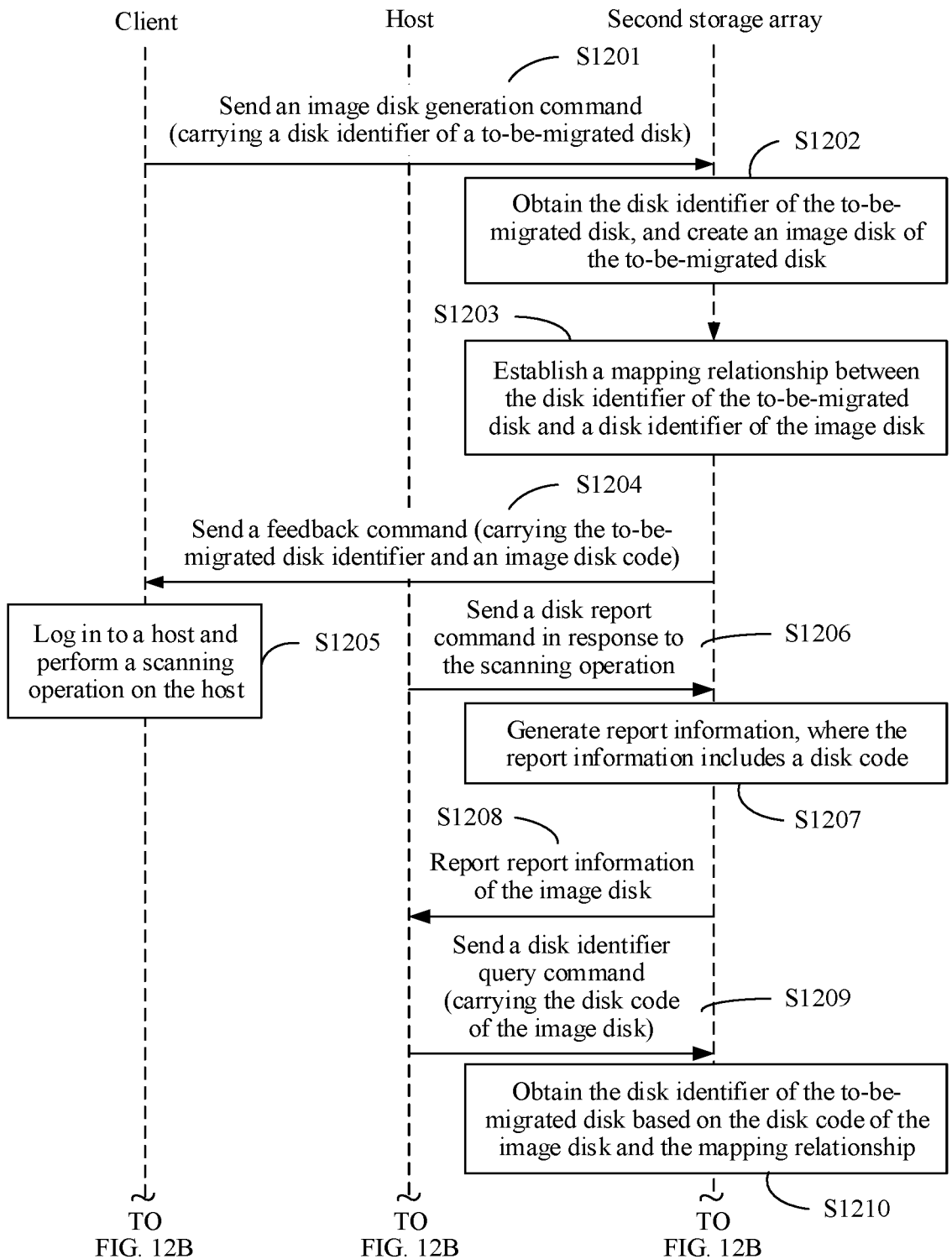
FIG. 12A and FIG. 12B are a flowchart of a method for migrating data in a first storage array to a second storage array according to Embodiment 4 of the present application.
Figure 12B:
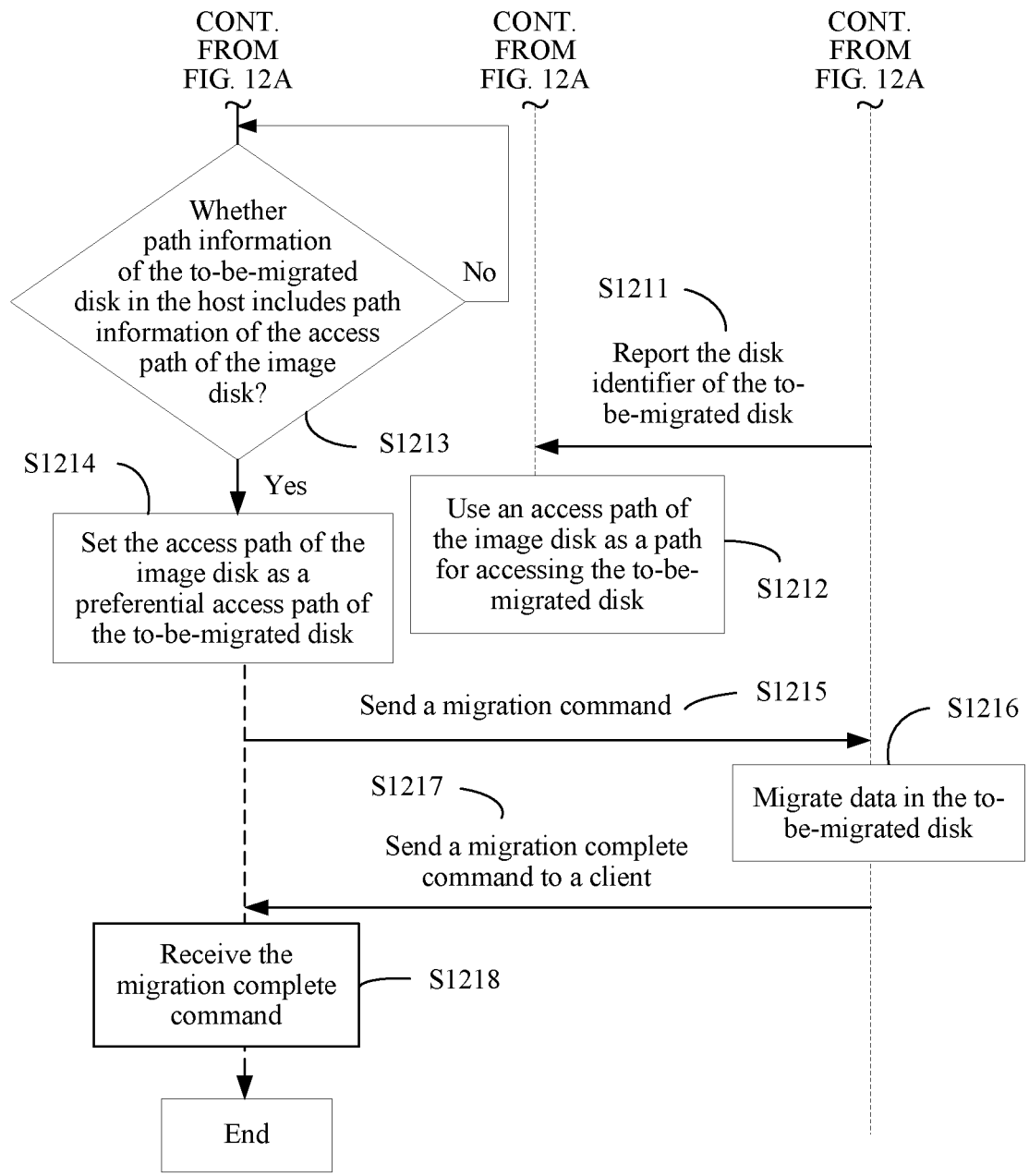

The following describes an I/O request processing method in Embodiment 4 with reference to a flowchart shown in FIG. 12A and FIG. 12B.

Step S1201: A client 300 first sends an image disk generation command to a second storage array 450 in response to a data migration operation of a user. The image disk generation command carries a disk identifier of a to-be-migrated disk.

Similar to Embodiment 1, a first storage array 140 is an old storage array, and the second storage array 450 is a new storage array. A host 410 manages, by using the method shown in FIG. 2, a path for accessing a disk that is in the first storage array 150 and that is mounted to the host. The host 410 stores information about the disk that is in the first storage array 150 and that is mounted to the host 410, for example, a disk name, a disk code, and a disk identifier of the disk mounted to the host 410. When the user needs to migrate data in the to-be-migrated disk 141 in the first storage array 140, the disk identifier of the to-be-migrated disk 141 needs to be first obtained from the host 410 by using the client 300, and then the disk identifier of the to-be-migrated disk is added to the image disk generation command and the image disk generation command is sent to the second storage array 450.

Step S1202: After receiving the image disk generation command, the second storage array 450 obtains the disk identifier of the to-be-migrated disk carried in the image disk generation command, creates an image disk 151 of the to-be-migrated disk 141, and allocates a disk identifier, a disk code, and a host port to the image disk 151.

An agent module 452 and an image module (not shown in the figure) are installed in the second storage array 450. The agent module 452 first receives the image disk generation command, parses the image disk generation command, and sends the parsed image disk generation command to the image module. The image module may generate the image disk 151 of the to-be-migrated disk according to the image disk generation command.

A process of creating the image disk is the same as that in Embodiment 1. For details, refer to descriptions of step S305 in FIG. 4A. Details are not described herein again.

Step S1203: The second storage array 450 establishes a mapping relationship between the disk identifier of the to-be-migrated disk and the disk identifier of the image disk.

After the image module completes creation of the image disk, the image module 452 transmits the disk identifier of the image disk to the agent module, and the agent module establishes the mapping relationship between the disk identifier of the image disk and the disk identifier of the to-be-migrated disk.

Step S1204: The second storage array 450 sends an image disk creation complete feedback command to the client 300. The feedback command carries the disk identifier of the to-be-migrated disk and the disk code of the image disk.

After establishing the mapping relationship between the disk identifier of the image disk and the disk identifier of the to-be-migrated disk, the agent module 452 adds the disk identifier of the to-be-migrated disk and the disk code of the image disk to the feedback command, and sends the feedback command to the client 300.

Step S1205: After receiving the feedback command, the client 300 determines, based on the disk identifier of the to-be-migrated disk, that creation of the image disk of the to-be-migrated disk is completed, stores the disk code of the image disk, logs in to the host 410, and performs a scanning operation on the host.

It should be noted herein that, after receiving the feedback command, the client 300 may automatically log in to the host to trigger the host to send a disk report command, or generate a notification to notify the user that creation of the image disk of the to-be-migrated disk is completed. The user may log in to the host 410 by using the client 300, and perform a scanning operation on the host 410. The notification may be a prompt box, that is, a prompt box is popped up on the client 300, and content of the prompt box is that creation of the image disk of the to-be-migrated disk is completed.

Step S1206: The host 410 sends a disk report command to the second storage array 450 in response to the scanning operation.

Step S1207: The second storage array 450 receives the disk report command, and generates report information according to the disk report command. The report information includes a reported disk code of a disk. For generation of the report information, refer to related descriptions of step S202 in FIG. 2. Details are not described herein again.

Step S1208: The second storage array 450 reports report information of the image disk, and in a process of reporting the report information, generates path information of a path used for reporting the report information.

When the generated report information passes through the agent module 452, the agent module 452 determines the report information of the image disk based on the disk code in the report information, and reports the report information of the image disk to the host. The second storage array allocates the disk code and the disk identifier to the image disk after the image disk is created. Therefore, the agent module determines, based on the disk code in the report information, a disk identifier corresponding to the disk code. If the disk identifier corresponding to the disk code exists in the mapping relationship between the disk identifier of the image disk and the disk identifier of the to-be-migrated disk, the report information including the disk code is the report information of the image disk.

S1209: After receiving the report information of the image disk, the multipath module of the host sends a disk identifier query command to the second storage array by using a path indicated by the path information in the report information. The path indicated by the path information in the report information is an access path of the image disk.

S1210: After receiving the disk identifier query command, the second storage array obtains the disk identifier of the to-be-migrated disk based on the disk code of the image disk and the mapping relationship between the disk identifier of the image disk and the disk identifier of the to-be-migrated disk.

The disk identifier query command carries the disk code of the image disk. The agent module 452 determines the disk identifier of the image disk based on the disk code of the image disk in the disk identifier query command, and obtains the disk identifier of the to-be-migrated disk based on the mapping relationship.

S1211: Report the disk identifier of the to-be-migrated disk to the host by using the access path of the image disk.

S1212: The host uses the access path of the image disk as a path for accessing the to-be-migrated disk.

When determining that the received disk identifier is the disk identifier of the to-be-migrated disk, the multipath module of the host records path information of an access path for reporting the image disk of the to-be-migrated disk in path information of a disk object (for example, sda) corresponding to the to-be-migrated disk, to use the access path of the image disk as the path for accessing the to-be-migrated disk.

S1213: After step S1205, the client starts to detect whether path information of the to-be-migrated disk in the host includes path information of the access path of the image disk.

After a predetermined time such as 10 s when the client sends the disk identifier report command, the client aperiodically or periodically inquires the host for the path information corresponding to the to-be-migrated disk. If the disk code included in the path information of the to-be-migrated disk is consistent with the disk code that is of the image disk and that is reported by the second storage array in step S1204, the path indicated by the path information is considered as the access path of the image disk.

S1214: If the path information of the to-be-migrated disk includes the path information of the access path of the image disk, the client sets the access path of the image disk as a preferential access path of the to-be-migrated disk.

S1215: The client sends a migration command to the second storage array. The migration command may carry the disk identifier of the image disk or may carry the disk identifier of the to-be-migrated disk.

S1216: The second storage array migrates data in the to-be-migrated disk.

A process in which the second storage array migrates the data in the to-be-migrated disk is the same as that in Embodiment 1. For details, refer to descriptions of step S318 in FIG. 4B. Details are not described herein again.

S1217: After completing migration of the data in the to-be-migrated disk, the second storage array sends a migration complete command to the client.

S1218: After receiving the migration complete command, the client may complete a process of migrating the data in the to-be-migrated disk.

In the data migration process, the host may deliver an I/O request to the second storage array by using the access path of the image disk, and the second storage array accesses data in the image disk.

Figure 13:
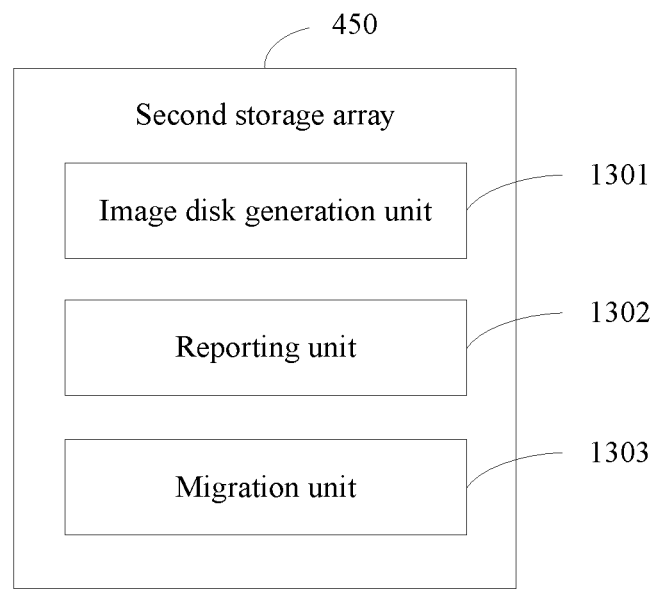
FIG. 13 is a block diagram of a second storage array according to Embodiment 4 of the present application.
Figure 14:
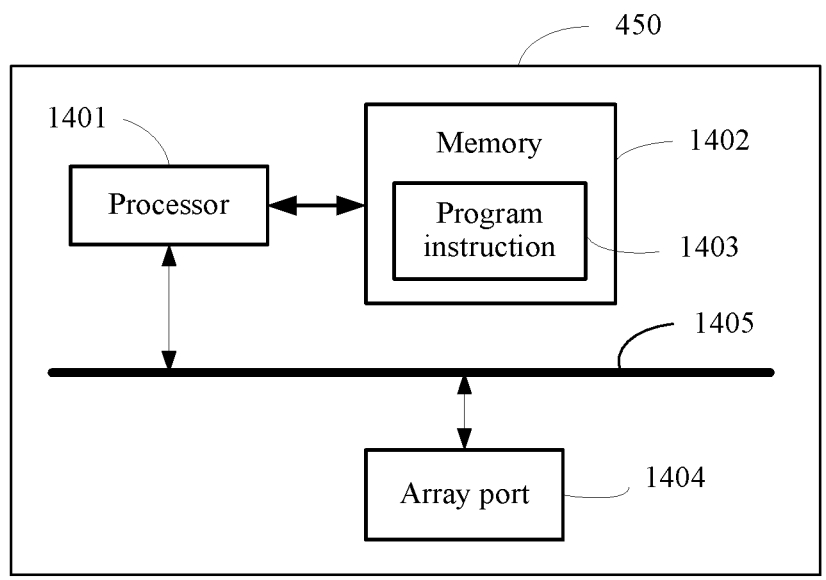
FIG. 14 is a structural diagram of a second storage array according to Embodiment 4 of the present application.

As shown in FIG. 13, FIG. 13 is a functional block diagram of a second storage array corresponding to the I/O request processing method in Embodiment 4. The second storage array includes an image disk generation unit 1301, a reporting unit 1302, and a migration unit 1303. The image disk generation unit 1301 is configured to: receive an image disk generation command sent by a client 300, and create an image disk of a to-be-migrated disk based on a disk identifier of the to-be-migrated disk carried in the image disk generation command, where the to-be-migrated disk is created in a first storage array; and after completing creation of the image disk of the to-be-migrated disk, establish a mapping relationship between a disk identifier of the image disk and the disk identifier of the to-be-migrated disk, and send an image disk creation complete feedback command to the client 300. Functions executed by the image disk generation module 1301 are corresponding to steps S1202 and S1204 in FIG. 12A.

The reporting unit 1302 is configured to: receive a disk report command sent by a host, and generate report information according to the disk report command. The report information includes a reported disk code of a disk. After receiving report information of the image disk, the host sends a disk identifier query command to the second storage array by using a path indicated by path information in the report information. After receiving the disk identifier query command, the reporting unit 1302 obtains the disk identifier of the to-be-migrated disk based on a disk code of the image disk and the mapping relationship between the disk identifier of the to-be-migrated disk and the disk identifier of the image disk, and reports the disk identifier of the to-be-migrated disk to the host by using an access path of the image disk. Functions executed by the unit are corresponding to steps S1208, S1210, and S1211 in FIG. 12A and FIG. 12B.

In this case, the host uses the access path of the image disk as a path for accessing the to-be-migrated disk.

When determining that the received disk identifier is the disk identifier of the to-be-migrated disk, a multipath module of the host records path information of an access path for reporting the image disk of the to-be-migrated disk in path information of a disk object (for example, sda) corresponding to the to-be-migrated disk, to use the access path of the image disk as the path for accessing the to-be-migrated disk. Further, the client starts to detect whether path information of the to-be-migrated disk in the host includes the path information of the access path of the image disk. If the path information of the to-be-migrated disk includes the path information of the access path of the image disk, the client sets the access path of the image disk as a preferential access path of the to-be-migrated disk, and sends a migration command to the second storage array.

The migration unit 1303 is configured to migrate data in the to-be-migrated disk after receiving the migration command from the client.

As shown in FIG. 13, FIG. 13 is a structural diagram of a second storage array 450 according to Embodiment 4 of the present application. The second storage array includes a processor 1401, a memory 1402, a system bus 1405, and an array port 1404. The processor 1401, the memory 1402, and the array port 1404 are connected and communicate with each other by using the system bus 1405. An agent module 452 is stored in the memory 1402 in a form of a program instruction.

When the second storage array 450 runs, the processor 1401 executes the program instruction in the memory 1402 to perform the method procedure shown in FIG. 12A and FIG. 12B.

Embodiment 4 of the present application further provides a computer readable medium, including a program instruction. When the processor 1401 of the second storage array 450 executes the program instruction, the second storage array performs the method procedure executed by the second storage array in FIG. 12A and FIG. 12B.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. An input/output I/O request processing method, performed by a target storage array connected to a host, comprising:
    receiving a disk identifier query request sent by the host for querying a disk identifier of a first disk in the target storage array;
    reporting, to the host in response to the disk identifier query request, a disk identifier of a second disk in a source storage array according to a mapping relationship between the disk identifier of the first disk and the disk identifier of the second disk, wherein the first disk is a mirror disk of the second disk;
    receiving, from the host, an I/O request for accessing the second disk via a path for reporting the disk identifier of the second disk; and
    accessing the first disk according to the mapping relationship.

2. The method according to claim 1, further comprising:
    receiving an image disk generation command sent by a client connected to the target storage array; and
    generating the first disk based on the disk identifier of the second disk carried in the image disk generation command.

3. The method according to claim 2, further comprising:
generating the mapping relationship after creating the first disk.

4. The method according to claim 2, further comprising:
receiving a migration request;
migrating data from the second disk to the first disk.

5. A target storage array comprising:
a memory storing instructions; and
a processor coupled to the memory and configured to execute the instructions to perform operations of:
receiving a disk identifier query request sent by a host of a storage system for querying a disk identifier of a first disk in the target storage array, wherein the target storage array is in the storage system;
reporting, to the host in response to the disk identifier query request, a disk identifier of a second disk in a source storage array according to a mapping relationship between the disk identifier of the first disk and the disk identifier of the second disk, wherein the first disk is a mirror disk of the second disk;
receiving, from the host, an I/O request for accessing the second disk via a path for reporting the disk identifier of the second disk; and
accessing the first disk according to the mapping relationship.

6. The target storage array according to claim 5, wherein the processor executes the instructions to further perform operations of:
receiving an image disk generation command sent by a client connected to the target storage array; and
generating the first disk based on the disk identifier of the second disk carried in the image disk generation command.

7. The target storage array according to claim 6, wherein the processor executes the instructions to further perform an operation of:
generating the mapping relationship after creating the first disk.

8. The target storage array according to claim 6, wherein the processor executes the instructions to further perform an operation of:
receiving a migration request from the client; and
migrating data from the second disk to the first disk.

9. An input/output (I/O) request processing method performed by an agent module of a host of a storage system for substituting a first storage array with a second storage array, the method comprising:
reporting, to a multipath module of the host, virtual path information for a virtual path between the agent module and the multipath module;
receiving a disk identifier query request sent by the multipath module via the virtual path, wherein the disk identifier query request is for querying the disk identifier of a first disk in a first storage array;
sending, to the multipath module in response to the disk identifier query request, a disk identifier of a second disk in the second storage array according to a mapping relationship between the first disk and the second disk, wherein the first disk is a mirror disk of the second disk;
receiving via the virtual path an I/O request from the multipath module, wherein the I/O request is for accessing the second disk; and
sending the I/O request to the first storage array to access the first disk.

10. The method according to claim 9, further comprising:
obtaining the disk identifier of the first disk;
obtaining the disk identifier of the second disk; and
recording a mapping relationship between the disk identifier of the first disk and the disk identifier of the second disk.

11. The method according to claim 9, wherein before obtaining the disk identifier of the first disk in the first storage array, the method further comprises:
sending the disk identifier of the second disk to the first storage array to instruct the first storage array to create the first disk.

12. The method according to claim 11, wherein the step of sending the disk identifier of the second disk to the first storage array uses a private command in a communication protocol between the host and the first storage array.

13. The method according to claim 9, wherein the virtual path information comprises a path number and a path pointer, the path number is used to identify the virtual path by the multipath module, and the path pointer points to a path used for accessing the first disk.

14. The method according to claim 9, wherein the step of obtaining the disk identifier of the first disk further comprises:
receiving identifiers of disks in the first storage array reported by the first storage array; and
obtaining the identifier of the first disk from the identifiers of the disks in the first storage array.

15. A host of a storage system, comprising:
a memory storing instructions; and
a processor coupled to the memory to execute the instructions to perform operations of:
reporting, to a multipath module of the host, virtual path information for a virtual path between the agent module and the multipath module;
receiving a disk identifier query request sent by the multipath module via the virtual path, wherein the disk identifier query request is for querying the disk identifier of a first disk in a first storage array of the storage system;
sending, to the multipath module in response to the disk identifier query request, the disk identifier of a second disk in a second storage array of the storage system according to a mapping relationship between the first disk and the second disk, wherein the first disk is a mirror disk of the second disk;
receiving via the virtual path an I/O request from the multipath module, wherein the I/O request is for accessing the second disk; and
sending the I/O request to the first storage array to access the first disk.

16. The host according to claim 15, wherein the processor executes the instructions to further perform operations of:
obtaining the disk identifier of the first disk;
obtaining the disk identifier of the second disk; and
recording a mapping relationship between the disk identifier of the first disk and the disk identifier of the second disk.

17. The host according to claim 16, wherein the operation of obtaining the disk identifier of the first disk comprises:
receiving identifiers of disks in the first storage array reported by the first storage array; and
obtaining the identifier of the first disk from the identifiers of the disks in the first storage array.

18. The host according to claim 15, wherein before obtaining the disk identifier of the first disk, the processor executes the instructions to further perform an operation of:
sending the disk identifier of the second disk to the first storage array to instruct the first storage array to create the first disk when determining the data of the second disk need to be migrated to the first storage array.

19. The host according to claim 15, wherein the virtual path information comprises a path number and a path pointer, the path number identifies the virtual path by the multipath module, and the path pointer points to a path used for accessing the first disk.

20. The host according to claim 15, wherein the operation of sending the disk identifier of the second disk to the first storage array uses a private command in a communication protocol between the host and the first storage array.

\* \* \* \* \*